March 11, 1969     L. E. RAVICH     3,432,262
METHOD FOR THE PRODUCTION OF AMORPHOUS CADMIUM SULPHIDE
Original Filed Jan. 7, 1953
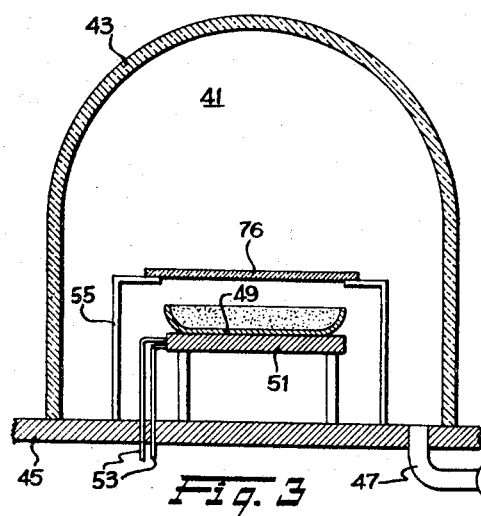
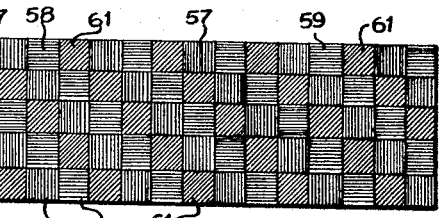
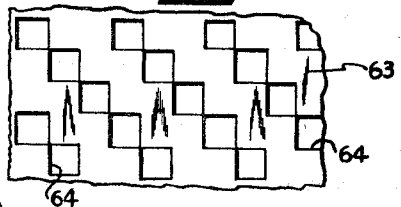
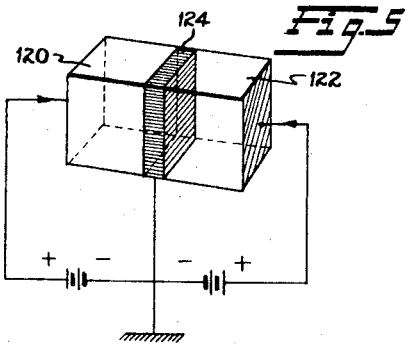
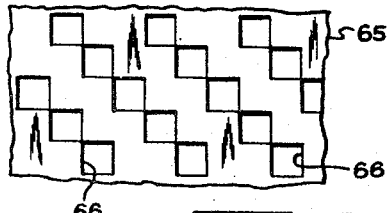
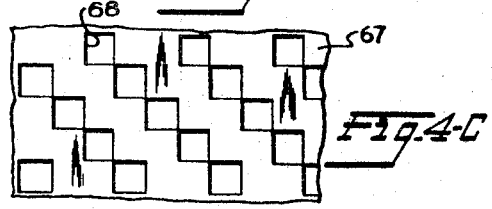
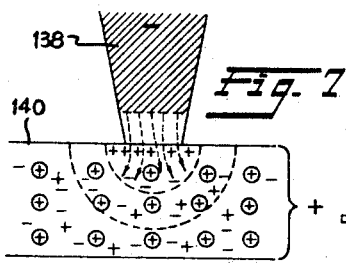
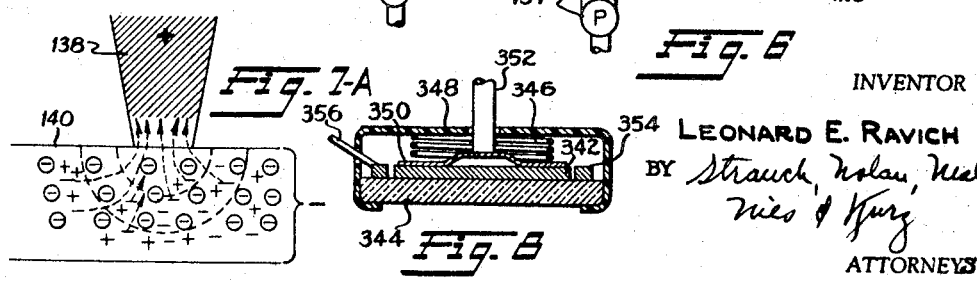
INVENTOR
LEONARD E. RAVICH
BY Strauch, Nolan, Neale, Nies & Kurz
ATTORNEYS

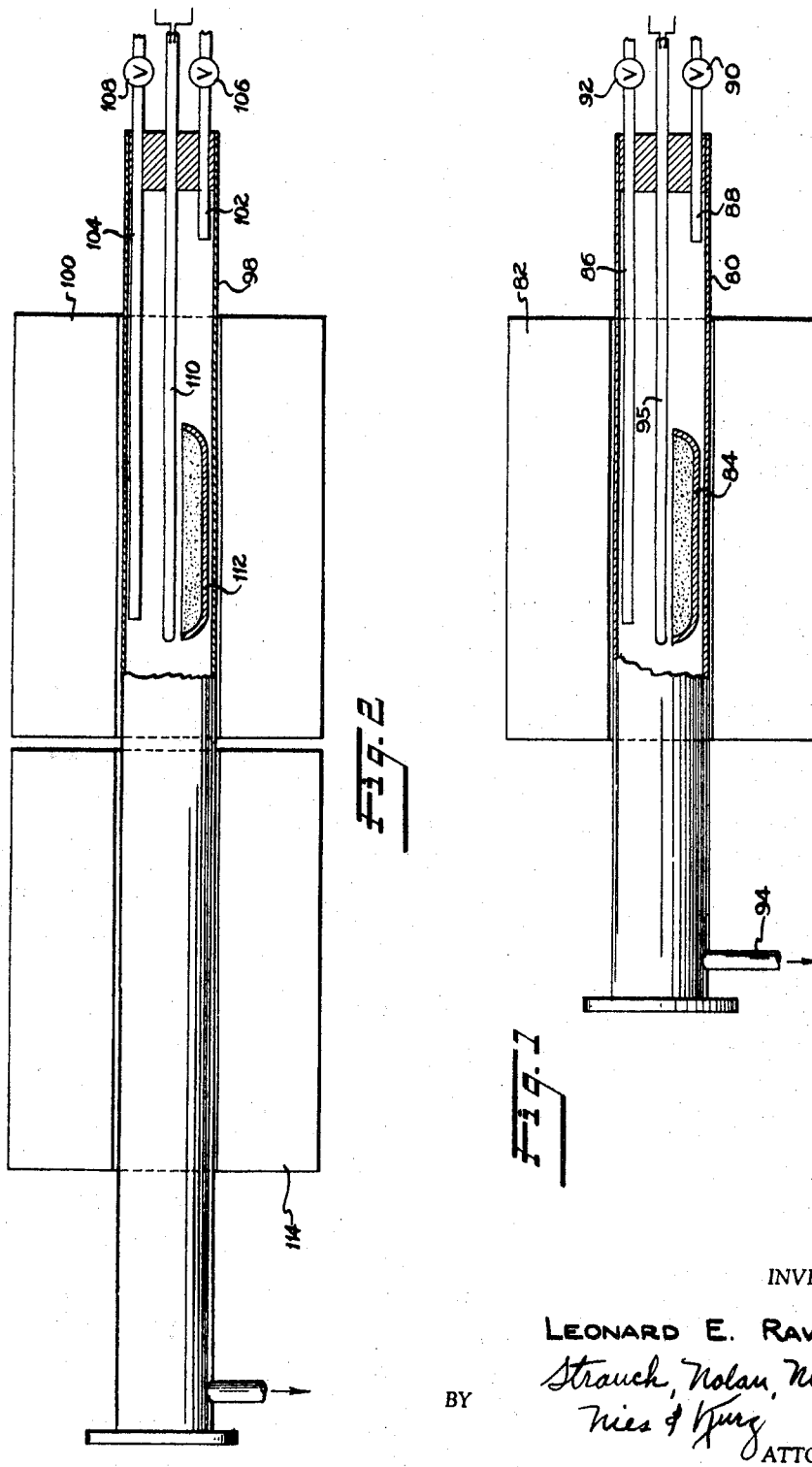

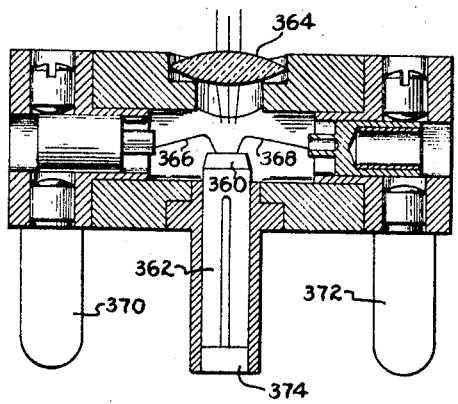
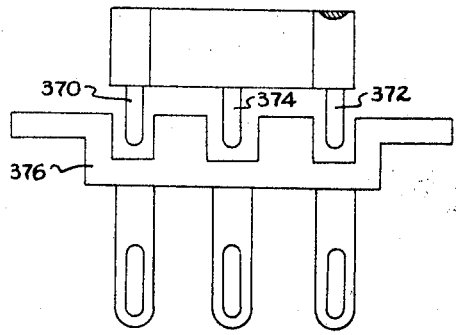
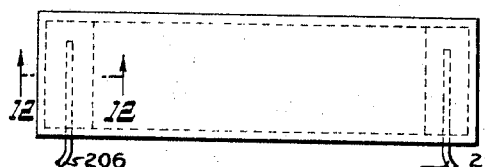
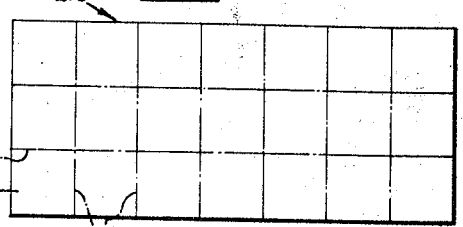
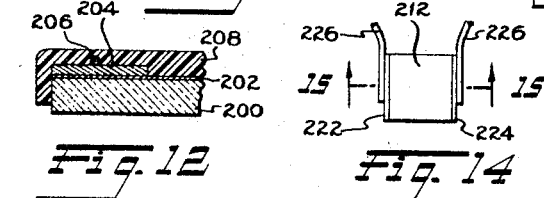
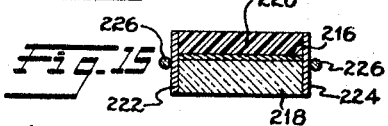
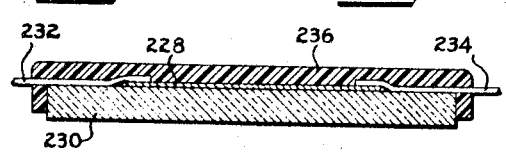
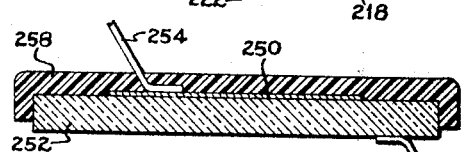
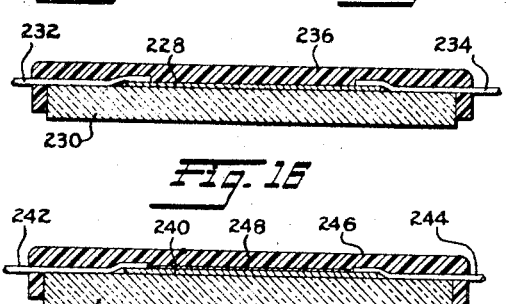
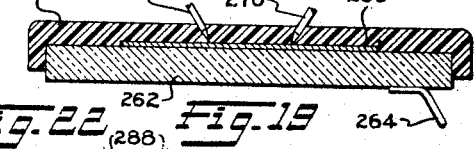
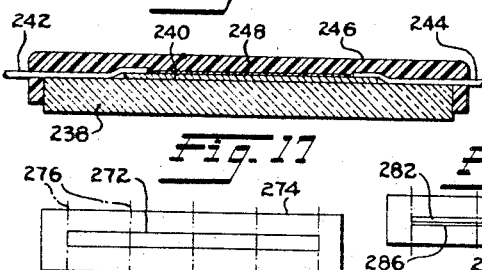
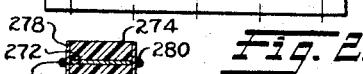
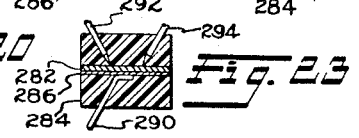
INVENTOR
LEONARD E. RAVICH
ATTORNEYS March 11, 1969   L. E. RAVICH   3,432,262
METHOD FOR THE PRODUCTION OF AMORPHOUS CADMIUM SULPHIDE
Original Filed Jan. 7, 1953   Sheet 5 of 10
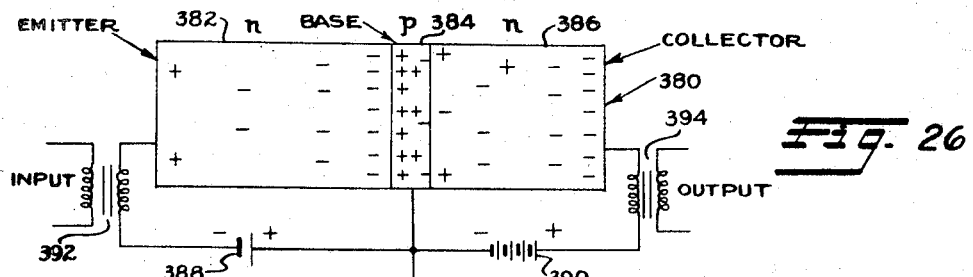
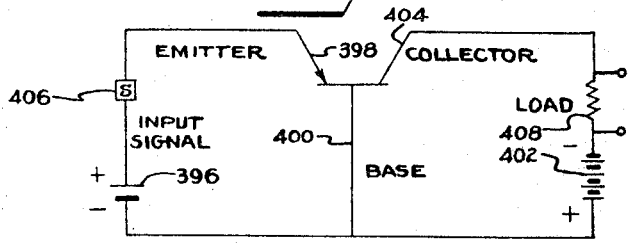
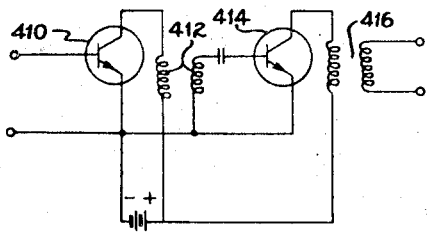
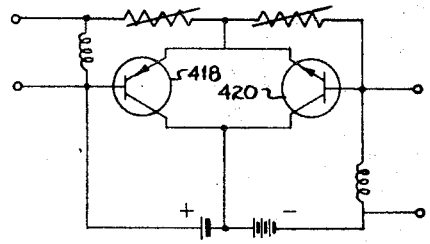
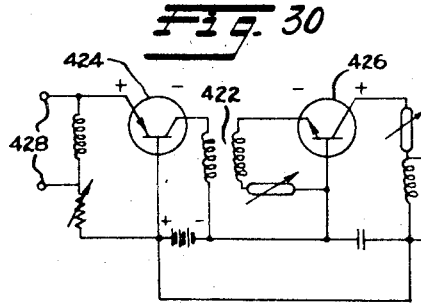
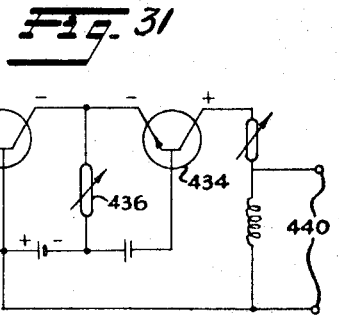
INVENTOR
LEONARD E. RAVICH
BY STRAUCH, NOLAN, NEALE,
NIES, AND KURZ ATTORNEYS

INVENTOR
LEONARD E. RAVICH
BY STRAUCH, NOLAN,
NEALE, NIES, AND KURZ
ATTORNEYS

INVENTOR
LEONARD E. RAVICH
ATTORNEYS

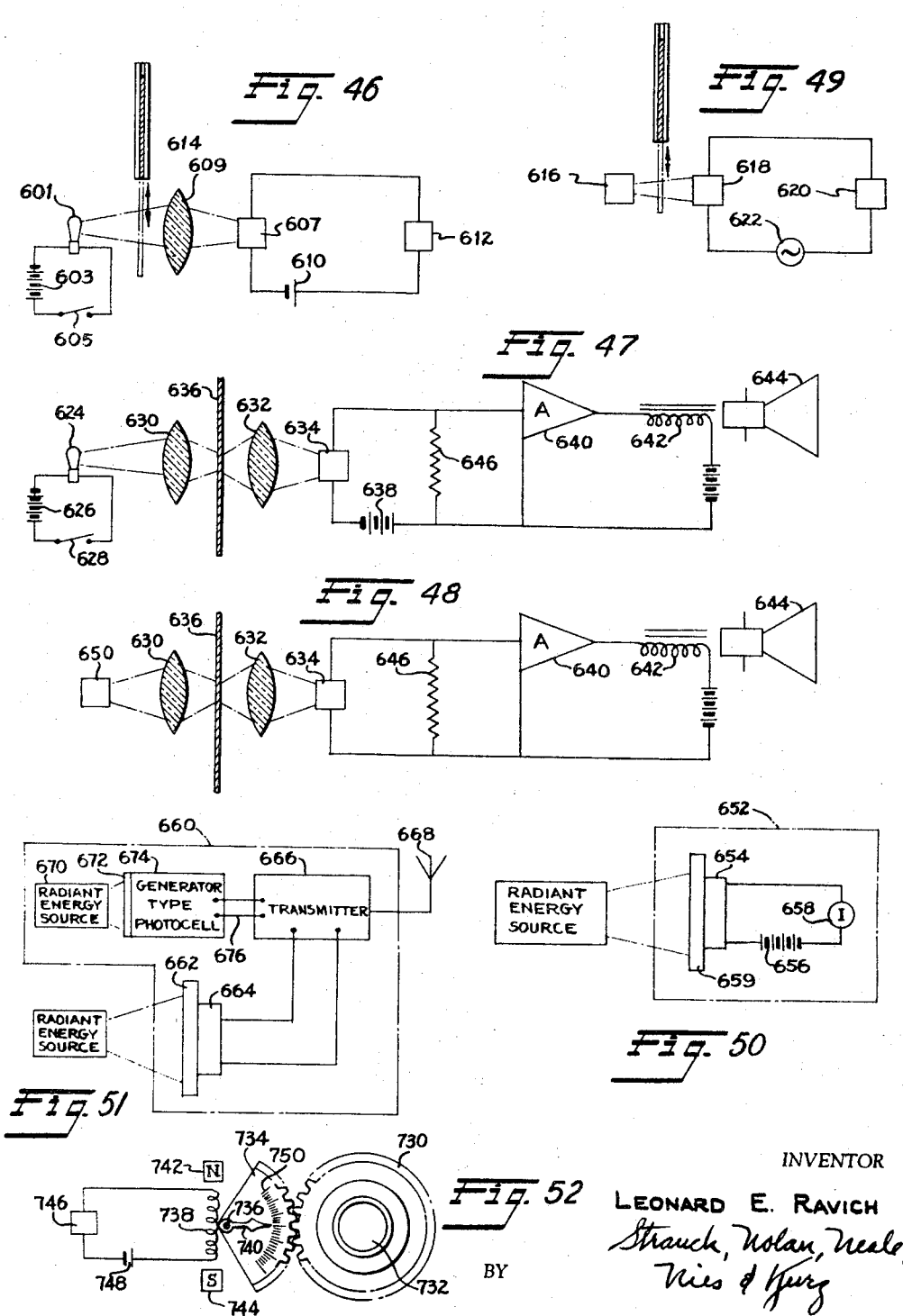

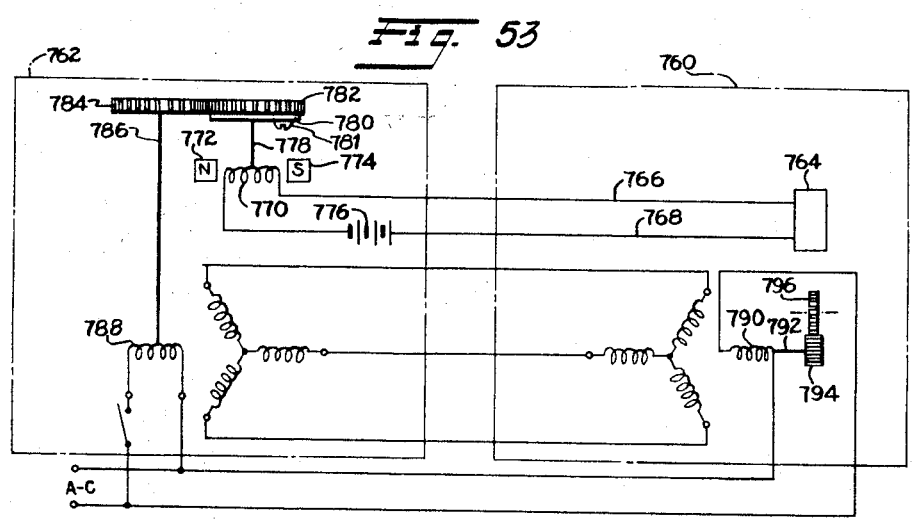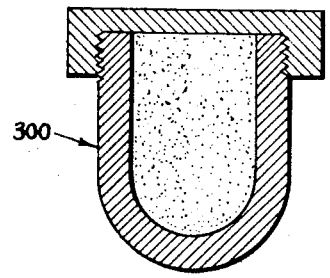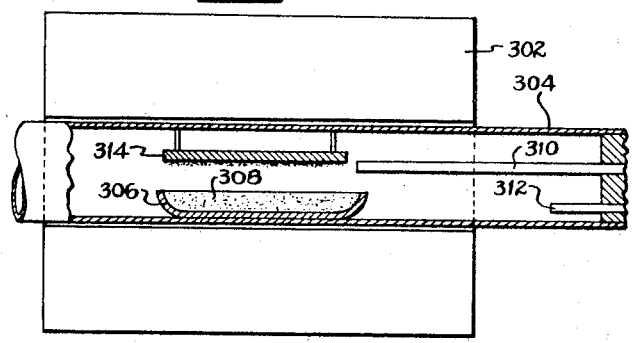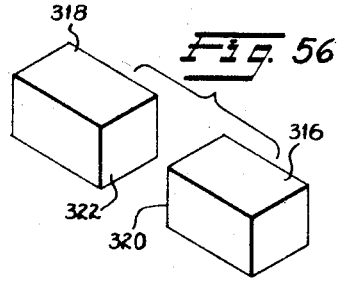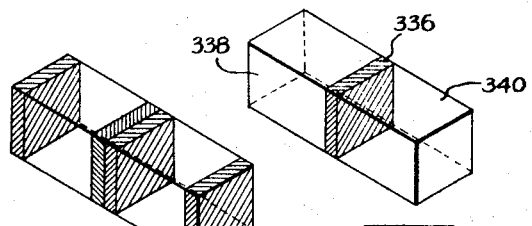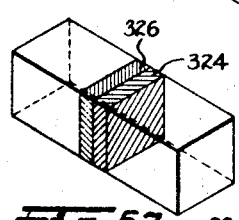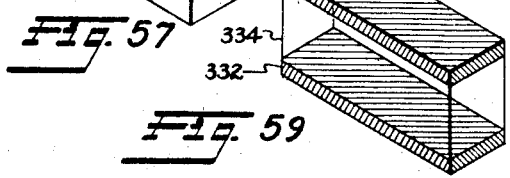

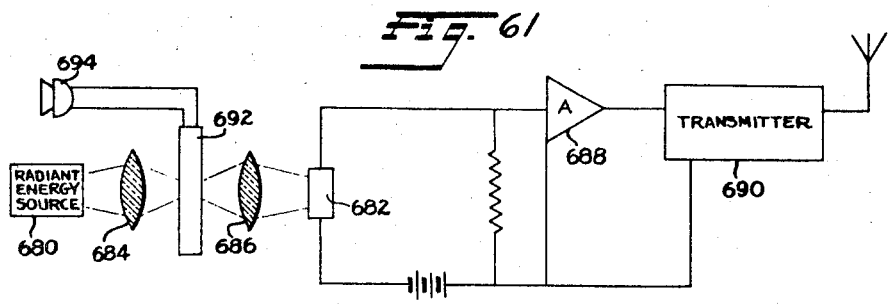
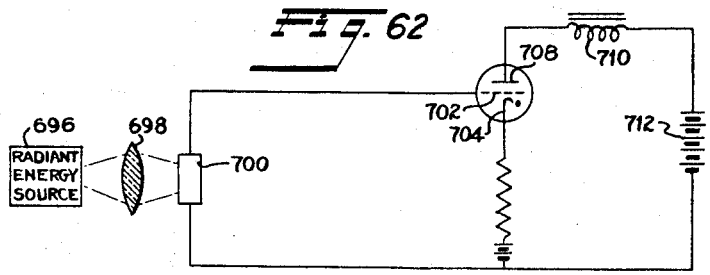
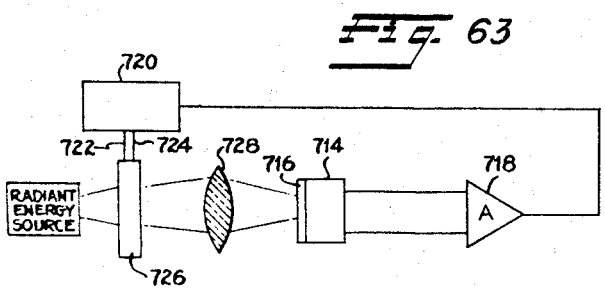

United States Patent Office 3,432,262
Patented Mar. 11, 1969

3,432,262
METHOD FOR THE PRODUCTION OF AMORPHOUS CADMIUM SULPHIDE
Leonard E. Ravich, Brookline, Mass., assignor to White Consolidated Industries, Inc., a corporation of Delaware
Application July 8, 1959, Ser. No. 825,801, now Patent No. 3,162,556, dated Dec. 22, 1964, which is a division of application Ser. No. 329,973, Jan. 7, 1953. Divided and this application Sept. 16, 1964, Ser. No. 412,271
U.S. Cl. 23—134      1 Claim
Int. Cl. C01g *11/00;* C01b *17/22*

ABSTRACT OF THE DISCLOSURE

A method of producing chemically pure cadmium sulphide wherein an aqueous solution of sodium thiosulphate containing cadmium sulfate is heated and maintained at its boiling point while maintaining the solution substantially neutral until a precipitate of cadmium sulphide and sulphur is formed, and wherein the sulphur is then separated from the cadmium sulphide. In another method a pure cadmium sulphide crystal is produced by vaporizing chemically pure cadmium sulphide without decomposition thereof and by effecting condensation of the thusly produced vapor upon a preformed cadmium sulphide seed at a temperature sufficiently high to produce crystalline growth. In a further method a monocrystalline electrical circuit component is produced by casting a preformed elongated crystal in a non-conductive base material and by cutting the assembly thus formed to predetermined lengths in planes generally transversely of the longitudinal axis of the crystal. In another method substantially identical radiation sensitive cells are produced by forming upon a relatively large plate like carrier a crystallitic deposit of uniform density by coating such deposit with a protective plastic layer, and by dividing such carrier into segments of substantially equal size.

RELATED APPLICATION

This application is a division of my copending application Ser. No. 825,801, filed July 8, 1959, now Patent No. 3,162,556, which in turn was a division of my application Ser. No. 329,973, filed Jan. 7, 1953, now abandoned.

The present invention relates primarily to the provision of electrical circuits having semi-conductor components therein and to the provision of entirely new forms of such semi-conductor components and materials therefor which are more highly efficient in the performance of their functions than those heretofore known and to improved techniques for modifying such materials for various applications in electrical circuitry.

The semi-conductor circuit components and materials to which I refer are those compounds, as distinguished from elements, which react in a predetermined pattern when subjected to one or more external stimuli as for example radiation sensitive elements such as photo-resistive, photo-conductive, photo-generative or phosphors, and also to thermal responsive resistors and to semi-conductor components which respond in a predetermined manner to the application of a constant and/or variable electrical potential which exhibit the transistor effect.

The activity of semi-conductor compounds is dependent upon the presence of covalent bonds between atoms of the compounds. In a chemically pure, nearly perfect crystal of the semi-conductor compounds herein discussed there are few or no free moving electrons. The valence electrons in the outer orbit of each atom are held to the valence electrons of the neighboring atom by covalent bonds. Because there is no free movement of electrons, such compounds act as insulators and current will not pass through nearly perfect crystals formed of such compounds. It is known that radiant energy impringing on the surface of such a crystal will cause a disturbance of the covalent bonds and there will be free electrons in the crystalline lattice so long as the radiant energy impinges upon the crystal. The amount of electrons flowing will be determined by the quantity of energy striking the material. Thus the excited crystal can act as a conductor and substantial voltages and currents can be passed. When the radiant excitation is removed the crystal returns to its original insulating state because covalent bonds have again formed and there are no free electrons to allow passage of the currents. The utility of these crystals for radiation sensitive devices is therefore apparent. For radiation sensitivity it is highly desirable to obtain a nearly perfect crystal with no strains and with a nearly perfect crystalline structure so that free electrons will not be present to cause a passage of current in the absence of excitation by a radiant source.

For the transistor effect without radiant excitation, however, it is desirable to have disturbance points set up in the crystal so that free electrons are present at all times. These disturbance points may be added by various means, for example:

(1) Disturbance points can be permanently established in a nearly perfect crystal by the introduction of strains within the crystalline lattice so that the lattice structure is such that covalent bonds cannot form with all the electrons present. There will be, therefore, some free electrons that will allow the compound to have its semi-conductor properties without external excitation from heat, light or other radiant energy.

(2) Another method of producing disturbance points in the crystalline lattice is by bombardment of the crystal as herein described. In this case electrons are permanently removed from the atom by a high energy beam of radiant energy. The charge on the material is changed so the mass becomes positive and holes are present. These holes allow the movement of electrons from a negatively charged mass into this positively charged mass causing a flow of current.

(3) A third method used previously for introducing disturbance points has been the introduction of a chemical impurity. Elements have been used that have a valence of one more or one less than the valence of material used as a semi-conductor. For example, germanium has a valence of four and consequently germanium will attach itself to its neighboring atom by the four electrons in the outer orbit. These covalent bonds formed will allow no movement of electrons in the dark. If, however, an impurity compound is added having a valence of three, covalent bonds can form only with the three electrons so that a fourth electron is unattached. If the impurity has a valence of five, covalent bonds are formed with the four electrons of germanium leaving an extra electron for passage of the currents.

In the past, one of the factors which has limited the utilization of these semi-conductor compounds, such as cadmium sulphide, zinc sulphide, lead sulphide, cadmium telluride and cadmium selenide, has been the lack of a reliable method of producing predictable types of chemically pure semi-conductor compound material. Among the methods heretofore suggested, for example, is that reported in Chemical Abstracts, vol. 45, No. 15, at page 6109h for the production of zinc and cadmium sulphides. None of the prior art methods, so far as I am aware, has successfully achieved the production of chemically pure zinc or cadmium sulphide.

It is accordingly one of the fundamental objects of the present invention to provide new and improved methods and means for the production of chemically pure materials for the production of semi-conductor compounds.

A further object of the present invention is to provide semi-conductors of the compound, as disinguished from the element type in forms such as mono-crystals with larger surface area than heretofore known, amorphous materials of higher chemical purity than heretofore known, and large area coatings produced by techniques such as vacuum evaporation techniques and other coating techniques used in cathode-ray tube and X-ray screen manufacture which coatings are of higher stability and greater uniformity than any heretofore known.

It is also an object of this invention to provide a practical method of producing amorphous cadmium sulphide of such chemical purity that it is not luminescent when subjected to the influence of ultra-violet radiation of both the 2537 A. and 3660 A. lines.

A further specific object of this invention is to provide a novel method for producing chemically pure plate-like crystals of semi-conductor compounds.

It is a further fundamental object of the present invention to provide semi-conductor compounds and methods of producing such semi-conductor compounds with which, by control of the disturbance points of the crystals, semi-conductors having predictable characteristics in response to a particular stimulus are readily producible.

More specifically it is an object of this invention to provide a semi-conductor and methods for producing the same, which semi-conductor will respond to one or more predetermined classes of stimuli without material sensitivity or response to the random subjection to extraneous stimuli.

Heretofore, in the field of radiation sensitive devices, it has been necessary to calibrate each radiation sensitive instrument in accordance with the particular radiation sensitive element used due to the inability to produce a quantity of radiation sensitive elements of identical characteristics of materials of the chemical type hereinbefore set forth.

It is therefore a further object of the present invention to provide a method of producing sets of radiation sensitive elements in which the elements of any one set have identical characteristics whereby the elements of each set may be used in radiation sensitive devices without calibration of each individual instrument.

A further object of the present invention which will fully appear hereinafter is the provision of means and methods for facilitating the mounting of radiation sensitive substances and semi-conductor components so that they may be readily handled in manufacture and shipping and when used as electrical circuit components, readily electrically connected to related components in a given electrical circuit.

Another object of the present invention resides in the provision of new and improved electrical circuits embodying radiation sensitive and/or semi-conductor components formed of semi-conductor compounds whereby the stability of operation of such circuits is materially improved.

A still further object of the present invention resides in the provision of radiation sensitive systems embodying self contained radiant energy sources and radiation detectors cooperating therewith capable of detecting the quantity of radiation received from such sources and producing communicatable electrical signal proportional thereto.

These and other objects of the present invention will become more fully apparent by reference to the appended claim as the following detailed description proceeds in reference to the accompanying drawings wherein:

FIGURE 1 is a diagrammatic illustration of one form of apparatus used in the production of semi-conductive mono-crystals in accordance with the present invention;

FIGURE 2 is a diagrammatic illustration of a second and preferred form of apparatus used in the production of semi-conductive mono-crystals;

FIGURE 3 is a diagrammatic illustration of apparatus for producing crystallitic semi-conductive coatings in accordance with the present invention;

FIGURE 4 is an enlarged view illustrating a mosaic pattern of crystallitic inorganic phosphor depositions;

FIGURES 4A, 4B and 4C illustrate masks utilized on the formation of the mosaic pattern of FIGURE 4;

FIGURE 5 is a diagrammatic illustration of a junction type transistor formed in accordance with the present invention;

FIGURE 6 is a diagrammatic illustration of an ion gun for ionic bombardment of a semi-conductor for controlling the disturbance point distribution thereof;

FIGURES 7 and 7A are diagrammatic illustrations of the introduction of disturbance points into a semi-conductive crystal for use as a point transistor;

FIGURE 8 is an illustration of one form of improved radiation sensitive element mount;

FIGURE 9 illustrates a photo-transistor with a lens mounting;

FIGURE 10 illustrates one form of a transistor on its support;

FIGURE 11 is a plan view of an improved radiation sensitive cell having a crystallitic semi-conductive substance as the radiation responsive element;

FIGURE 12 is a sectional view along the line 12—12 of FIGURE 11;

FIGURE 13 is a plan view of an improved evaporated coated sheet illustrating the manner in which such sheet can be divided into small units to produce radiation sensitive cells;

FIGURE 14 is a plan view of such a cell cut from the sheet of FIGURE 13 and provided with electrical contacts;

FIGURE 15 is a sectional view of the cell of FIGURE 14 taken along the line 15—15 of FIGURE 14;

FIGURE 16 is a longitudinal sectional view of an improved photo sensitive cell of the mono-crystalline semi-conductive type;

FIGURE 17 is a view similar to FIGURE 16 of a crystalline semi-conductive radiation sensitive circuit component provided with a reflector to increase its photoconductivity;

FIGURE 18 is a longitudinal sectional view of an improved modified form of mono-crystalline semi-conductive radiation responsive circuit component;

FIGURE 19 is a longitudinal section view of a monocrystalline radiation sensitive transistor embodying my invention;

FIGURE 20 is a plan view illustrating the mounting of a radiation sensitive crystal within a transparent moldable plastic body whereby it can be divided into discrete radiation sensitive cells;

FIGURE 21 is a longitudinal sectional view of one of such cells;

FIGURE 22 is a plan view illustrating the mounting of a semi-conductive mono-crystal within a moldable plastic whereby it may be divided into discrete units of predetermined length for use as transistors;

FIGURE 23 is a longitudinal section view through one of such units and showing the manner in which it is adapted for use as a transistor by the provision of emitter, collector, and base contacts;

FIGURE 26 is a diagrammatic illustrating a typical basic circuit utilizing an n-p-n junction type transistor;

FIGURE 27 is a diagrammatic illustration of a basic circuit utilizing a point type transistor;

FIGURES 28, 29, 30 and 31 illustrate typical transistor circuits utilizing semi-conductor compound type transistors;

FIGURES 38, 39 and 40 illustrate amplifier circuits in accordance with my invention utilizing N-type transistors in which FIGURE 38 is the equivalent of a grounded grid triode and FIGURES 39 and 40 are equivalents of grounded plate triodes;

FIGURE 46 illustrates control of an electrical load by a radiant energy sensitive cell of the type of the present invention which is activated by a source of light;

FIGURE 47 illustrates a circuit for transforming signals on a conventional film sound track into sound by utilization of a radiation sensitive cell of the type of the present invention;

FIGURE 48 illustrates the utilization of a tritiated stilbene radiant energy source with a radiation sensitive cell of the type of the present invention for conversion of conventional sound track signals into audible sound;

FIGURE 49 illustrates an improved circuit similar to that of FIGURE 46 but in which tritiated stilbene is utilized as a radiant energy source in accordance with my invention;

FIGURES 50 and 51 illustrate improved monitors for detecting the presence of radiant energy;

FIGURE 52 illustrates a mechanism utilizing a radiation sensitive cell of the present invention for readily and accurately setting the aperture of a camera in accordance with the light intensity upon an object to be photographed;

FIGURE 53 illustrates an automatically operative remotely controllable aperture adjusting device for use in airborne cameras in accordance with my invention;

FIGURE 54 illustrates a high pressure bomb for use in making crystals in accordance with my invention;

FIGURE 55 illustrates an improved furnace assembly for forming crystalline layers;

FIGURES 56 to 60 illustrate the formation of junction type transistors in accordance with my invention;

FIGURE 61 illustrates diagrammatically a small compact portable voice modulated transmitter suitable for field use by the Armed Forces in accordance with my invention;

FIGURE 62 illustrates diagrammatically a control circuit responsive to the accumulative effect of the impingement of radiant energy upon a cell over a period of time in accordance with my invention; and FIGURE 63 is a diagrammatic illustration of a control device operative to maintain the quantity of radiation impinging upon a particular area at a preselected level in accordance with my invention.

PRODUCTION OF AMORPHOUS CADMIUM SULPHIDE

Figure 24:
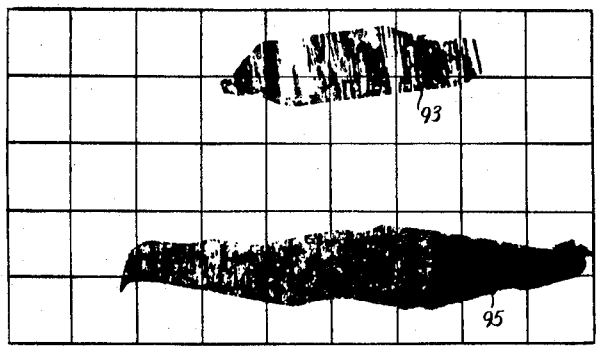
FIGURES 24 and 25 are reproductions of photographs illustrating various sizes, shapes and internal structural formations of semi-conductor compound crystals which have been produced in accordance with the methods of the present invention.

In order to obtain the high purity compounds for my new semi-conductor materials, I have developed new techniques to control the initial production of the compounds. One example of this is the production of amorphous cadmium sulphide now to be described.

Prior to the present invention, there has been no practical method of producing chemically pure cadmium sulphide. The fact that the cadmium sulphide produced by the heretofore known methods contains chemical impurities may be readily established by subjecting the cadmium sulphide so produced to ultra-violet radiation of wave lengths of 2537 A. and 3660 A. while in its amorphous state. Impure amorphous cadmium sulphide will luminesce when subjected to radiation of one or the other of such wave lengths whereas chemically pure amorphous cadmium sulphide will not luminesce when subjected to either band.

The production of cadmium sulphide of this extreme degree of purity is of great importance. For example, only with cadmium sulphide of such purity is it possible to produce a cathodoluminescent phosphor giving off a pure red color rather than a mixed red and yellow color. One of the principal uses of such an inorganic phosphor is in the production of screen tubes for color television.

I have found that cadmium sulphide of highest chemical purity known can be produced by treating an aqueous solution of sodium thiosulphate ($Na_2S_2O_3$) of the highest chemical purity available, the relative proportions of water to sodium thiosulphate apparently not being critical but satisfactory results have been produced with a ratio of one gram of sodium thiosulphate to two cubic centimeters of triple distilled water, with cadmium sulphate ($CdSO_4$) of the highest chemical purity available, heating the solution to its boiling point while maintaining continuous agitation and maintaining the heat and agitation until amorphous cadmium sulphide and colloidal sulphur precipitates. This solution must be maintained substantially neutral (that is in a condition in which it is neither substantially acid nor basic) throughout the boiling if pure cadmium sulphide is to be produced. I have found that at atmospheric pressure, this boiling, in order to precipitate all of the cadmium sulphide and sulphur, must be continued for at least ten minutes after the boiling point is reached. The precipitated cadmium sulphide and sulphur are then separated from the liquid by filtering or by use of a centrifuge. The residue is washed with distilled water until all soluble impurities are removed. After washing, the precipitated sulphur is separated from the precipitated cadmium sulphide either by dissolving the sulphur in a solvent in which cadmium sulphide is insoluble, as for example with carbon disulfide, or by oxidation of the sulphur at a temperature which will not decompose the cadmium sulphide. Since sulphur burns in atmosphere at about 450° C., this separation can be readily effected by burning off the sulphur. When it is desired to retain the light yellow color of the amorphous cadmium sulphide, carbon disulphide is used to effect this separation to avoid the change of the cadmium sulphide to its slightly orange color which occurs when it is heated over 400° C. The resultant amorphous cadmium sulphide is absolutely chemically pure, exhibiting no luminescence when subject to ultra-violet radiation of wave lengths of 2537 A. and 3660 A.

The fundamental consideration in the formation of amorphous cadmium sulphide is, therefore, the formation of the cadmium sulphide in a medium of such physical and chemical characteristics that the cadmium can be readily and completely separated from such medium without decomposition or contamination of the cadmium sulphide. In the present method, the cadmium sulphide and sulphur precipitate can be completely separated from the residual liquid either by filtration or centrifuging and the sulphur can be completely separated from the cadmium sulphide in the precipitate either by dissolving the sulphur in carbon disulphide or by oxidation of the sulphur at a temperature at which cadmium sulphide is a completely stable solid.

It will be noted that the above described method of producing amorphous cadmium sulphide is quite similar to that reported in Chemical Abstracts aforesaid. The essential distinction lies on the fact that I have discovered that by maintaining substantial neutrality of the mixture during the period of boiling and precipitation, the precipitate formed consists solely of substances which are readily and completely separable, that is cadmium sulphide and sulphur. If substantial neutrality of the mixture is not maintained, forms of sulphur which are insoluble in carbon disulphide will be formed and thus prevent separation.

Pure amorphous cadmium sulphide has no visible luminescence but only a luminescence in the infrared range at approximately 8000A. when stimulated by ultra-violet radiation. To obtain pure red high intensity fluorescence with an emission spectra at about 6900A., the following procedure is used:

A weighed amount of the phosphor is mixed with an aqueous solution of silver nitrate ($AgNO_3$); the amount of silver nitrate in the solution is equivalent approximately to one ten thousandth of the weight of the phosphor. After constant stirring, the mixture is evaporated to dryness and the treated powder is heated to 400° C. for from ten minutes to one hour, for example. This heating causes diffusion into the powder particles of the silver resulting from the decomposition of the silver nitrate. This process is called activation of phosphors. An excess of silver over the optimum quantity will result in quenching of the fluorescence.

If pure unactivated cadmium sulphide is activated with manganese or a salt containing manganese in the proportions above, along with the silver, the fluorescence will tend to have an emission spectra higher than when the phosphor is activated with the pure silver, that is more toward the infrared and decay time of the fluorescence is increased. If copper is added by the same methods outlined above for manganese, a lower wave length spectra results and the decay time decreases. The phosphor is extremely sensitive to copper and if an excess is added, complete quenching results. Traces of cobalt, nickel, iron or chromium will cause complete quenching and all processing must be controlled to prevent contamination by these materials.

This phosphor in its pure form produces the highest intensity pure red fluorescence known today, 6900 A. and above. If a further increase in intensity is desired, the addition of 10% zinc sulphide activated with silver in the same manner will result in a still higher intensity but a slight deviation from pure red fluorescence, that is some emission at 6400 A. mixed with considerable emission at 5000 A.

The same procedure may be applied for activation of cadmium sulphide crystals and cadmium sulphide evaporated layers, the formation of which will be described hereinafter.

METHOD OF FORMING RADIATION SENSITIVE EVAPORATED COATINGS

The formation of radiation sensitive evaporated coatings of semi-conductor compounds of the type herein set forth will be described in detail as to cadmium sulphide. The same techniques are, in general, applicable to other compounds such as lead sulphide.

The chemically pure cadmium sulphide either in crystalline or amorphous form can be utilized in the production of either pure cadmium sulphide evaporated coatings or activated cadmium sulphide evaporated coatings. The cadmium sulphide of the required purity is preferably produced originally in its amorphous form in accordance with the method of the foregoing section.

The apparatus which I have used in the preparation of cadmium sulphide evaporated coatings is illustrated in FIGURE 3. This apparatus includes an enclosed sealed evaporation chamber 41 defined by a conventional bell jar 43 resting in fluid tight relation upon a planar base 45. A suitable conduit 47 is provided through the base 45 for controlling the atmospheric conditions within chamber 41. For the production of cadmium sulphide evaporated coatings, complete evacuation or substantially complete evacuation of the chamber 41 by connecting duct 47 to a suitable evacuating pump 48 produces highly satisfactory results. While I have produced satisfactory coating in pressures from .1 to 13 microns, I recognize that such values do not represent maximum or minimum values of pressure.

The amorphous or crystalline particle cadmium sulphide is placed in a ceramic receptacle 49, which may be in the form of an elongated boat or crucible, which rests upon a suitable electrical heating element 51 suitably supported above the base 45 and connected by wires 53 to an electrical power source (not shown). A support stand 55 is provided to support the article upon which the cadmium sulphide is to be deposited in spaced relation to the boat 49. This article (hereinafter referred to as a carrier) may be a simple glass slide, may be transparent, translucent or opaque insulating or conducting material, and may have a planar face to be coated or may be of any other desired configuration as for example a generally concave interior of a vessel. If desired a portion of the article may be masked to limit coating of the article to a specific area. For example, it may be desired to so mask the article to be coated so that only discrete separate areas are coated in one evaporating operation and the spaces are subsequently coated with another substance to from a mosaic. This technique is of utility in forming a mosaic screen of distinct cathodo-luminescent inorganic phosphors producing different colors when subjected to electron bombardment. Such a screen may be used for reproducing color images when bombarded by a properly controlled stream of electrons from electron guns.

This technique is illustrated in FIGURES 4, 4A, 4B and 4C. FIGURE 4 shows a mosaic pattern of crystallitic deposits, the areas having vertical 57, horizontal 59, and oblique 61 shading lines being coated respectively with three distinct cathodo-luminescent inorganic phosphors, as for example inorganic phosphors adapted to produce red (cadmium sulphide), blue (zinc oxide) and yellow (zinc sulphide) luminescence.

The vertically shaded areas are formed by coating the carrier while shielded by a mask 63 having apertures 64 such as that illustrated in FIGURE 4A, the horizontally shaded areas by using a mask 65 having apertures 66 such as that of FIGURE 4B, and the remaining obliquely shaded areas by using a mask 67 having apertures 68 such as that of FIGURE 4B.

It is to be understood that the areas 57, 59 and 61 and the corresponding apertures 64, 66 and 68 of the respective masks 63, 65 and 67 are greatly enlarged in these figures to facilitate illustration and in practice would be of such size that a focused electron beam would impinge upon but one aligned coated area at a time.

In FIGURE 3, a carrier 76, in the form of a piece of glass such as that used for microscope slides, is mounted upon the support 55 above the boat 49.

In the process of the present invention the cadmium sulphide to be sublimed is placed in the boat 49 and is heated slowly to the point at which it volatilizes, in the range of 800° C. to 1000° C., without decomposition in the evacuated chamber 41. If amorphous cadmium sulphide is used, it is preferably formed in pellet form with a pellet press to prevent sputtering. If small crystals are used, this is not necessary. The volatilized cadmium sulphide condenses upon the surface of the carrier 76 to produce a thin yellow transparent coating which appears to be almost in an amorphous form but which is believed to be actually in a fine crystallitic deposit of a depth of but several molecules. The depth of coating may of course be varied by controlling the quantity of cadmium sulphide sublimed.

A pure cadmium sulphide coating formed in this manner has been found to be highly sensitive to radiation up to the infrared range. Large carrier sheets may be coated and the sheet subsequently cut into small units to form small ultra-violet sensitive cells as will be described in greater detail hereinafter in reference to FIGURES 13, 14 and 15.

A phosphor can be produced by activation 1:10,000 to the pure cadmium sulphide either with silver, manganese, and copper individually or in combination, by simultaneous volatilization and condensation of the cadmium sulphide base and the activator, or by deposition of the activator upon a previously deposited cadmium sulphide coating and by simultaneous or subsequent heating to 400° C. for from 10 minutes to 1 hour. The activated coating formed when silver is used as an activator produces a pure red luminescence when subjected to cathode bombardment or ultra-violet radiation. Manganese and copper are utilized to vary the time constant.

It will be recognized by those skilled in the art that the foregoing method of producing cadmium sulphide coatings can be modified or extended by the use of the conventional evaporation techniques. One of such techniques is the improvement of the coating efficiency by the provision of an electrostatic or electromagnetic field controlling the movement of the cadmium sulphide source to the carrier. Another such technique is the provision of an independent means for controlling the temperature of the carrier rather than relying upon the spacing of the carrier from the heating element 70 to effect this control.

METHOD OF PRODUCING CADMIUM SULPHIDE CRYSTALS

Heretofore it has been customary in efforts to produce cadmium sulphide crystals to use cadmium metal as the source of cadmium. The result of such prior art methods has been the production of impure cadmium sulphide crystals containing pure cadmium as an impurity. The presence of this impurity can be readily recognized by the greenish-yellow color, lack of transparency, and poor photo and electrical characteristics of the crystals produced. In addition to this lack of purity, it has been impossible to produce consistently crystals of sufficient size for use as electrical circuit components. The normal cadmium sulphide crystal produced by such prior art methods is in the form of a long thin needle. A description of one method heretofore used in an effort to produce cadmium sulphide crystals will be found in Physical Review, volume 52, No. 7 of Oct. 1, 1947, at page 594 et seq. in an article by Rudolf Frerichs entitled "The Photo Conductivity of 'Incomplete Phosphors'." The impurity of the crystals produced by such method is apparent from the diagram of that article illustrating the photo conductivity of the crystals produced which shows the peaked response at approximately 5200 angstrom units and a decrease in photo conductivity to zero at approximately 6200 A. rather than the broad relatively uniform response throughout the range from cosmic rays, alpha, beta, and gamma rays to infra-red radiations that is found with pure cadium sulphide mono-crystals.

Two illustrative forms of apparatus which may be used in accordance with my improved method of producing cadmium crystals, such as those of cadmium sulphide or zince sulphide, are illustrated in FIGURES 1 and 2, respectively. Referring to FIGURE 1, the apparatus comprises a quartz tube 80 which is sealed at both ends and which extends through the center of a conventional cylindrical electric furnace capable of producing temperatures up to 1700 degrees centigrade. At approximately the center of this furnace 82 and within the quartz tube 80 is provided an elongated crucible or "boat" 84 formed of a suitable refractory material such as Sellmanite or Alundum. Through the right hand or inlet end of the quartz tube 80 extend suitable conduits 86 and 88 which may likewise be formed of quartz. The conduit 88 terminates within and is open into the quartz tube 80 adjacent the inlet end through which it extends and is connected externally of tube 80 to a suitable source of dry hydrogen gas of the highest chemical purity available through a suitable flow control element 90 which can produce either a continuous or pulsating gas flow and which may take the form of any suitable constructed adjustable pressure responsive valve. The conduit 86 is connected at its inlet end to a suitable source (not shown) of dry hydrogen sulphide gas, also of highest chemical purity, through a similar control element 92. The conduit 86 extends through the quartz tube 80 to a point at approximately the end of the elongated crucible 84 as illustrated. A suitable exhaust conduit 94 is provided at the opposite or outlet end of the quartz tube 80. A thermocouple (not shown) is provided within the central quartz thermo-couple tube 95 to determine the temperature at the vaporizing zone over the boat 84.

Prior to the initiation of the crystal forming operation, the crucible 84 is filled with amorphous powder of cadmium sulphide or zinc sulphide which, if chemically pure crystals are to be produced, is chemically pure and preferably produced in the manner previously described. While the crystal formation will be described in detail as to cadmium sulphide, it is to be understood that it is equally applicable to other compounds herein set forth such as zinc sulphide. As is well known, cadmium sulphide sublimes rather than passing through a liquid state. I have found that there are several critical factors which must be controlled if pure cadmium sulphide crystals are to be produced. The rate of heating of the cadmium sulphide in the crucible 84 and the quantity of the hydrogen introduced through the conduit 88 at the portion of the tube 80 surrounding the crucible 84 must be such that the vapor pressure is lowered so that the cadmium sulphide can readily vaporize at a low temperature (800 to 850° C.) without decomposition. The quantity of the hydrogen sulphide introduced through conduit 86 must be such that it prevents decomposition of the cadmium sulphide vapor into metallic cadmium and sulphur. In order for crystals to be formed, it is necessary to produce cadmium sulphide crystal seeds in the crystal forming zone beyond the crucible 84. This zone should be at the temperature of solidification of the cadmium sulphide vapor. I have found for example that, if the furnace is heated rapidly (up to approximately 15 minutes) to a point in which the temperature over the crucible 84 is approximately 925° C. and rapidly lowered (within approximately 15 minutes) to 600° C., seed crystals will form. The temperature is gradually raised from 600° C. to approximately 900° C. and the large flat crystals will grow on the seed. The longer the heating, the larger the crystal formations.

I have also found that seed crystals can also be produced with a uniform temperature rise by introducing a pulsating gas flow.

I have observed that the crystals during their formation first grow rapidly to an elongated form and after reaching almost full length, slowly grow in a direction normal to that of initial growth along the entire needle length to form a plate-like structure. As the plate-like structure develops there will be a slight increase in thickness of the plate and a slight increase in length from the initial length of the needle crystal formed.

Figure 25:
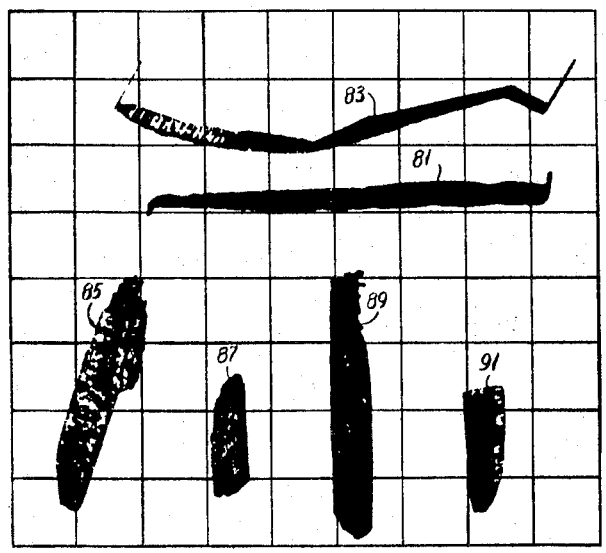

So far as is presently determined, the only limitations on the size of cadmium sulphide crystal mono-crystalline plates, which can be formed, is the size of the quartz tube in which they are grown and the quantity of amorphous cadmium sulphide which can be placed in the furnace. This method has consistently produced crystals of the size illustrated in FIGURES 24 and 25 and larger from approximately five grams of amorphous cadmium sulphide. These crystals are shown on a grid network in which each side of each square represents a length of five millimeters.

I have found that the sensitivity to radiation of the sulphide crystals produced varies widely in accordance with the manner in which the crystals are cooled. If the cadmium sulphide crystals produced are cooled slowly (from about 16 minutes to 48 hours) a practically transparent crystal results which is highly sensitive to radiation. The crystal designated 81 and the right hand portion of crystal 83 (both shown in FIGURE 25) are of such transparent structural formation. If the cadmium sulphide crystal is cooled rapidly, many strains are formed in the crystal in the manner illustrated by crystals 85, 87, 89 and 91 in FIGURE 25 and by crystals 93 and 95 in FIGURE 24. Crystals of maximum imperfection density exhibit an extremely low response to stimulation by radiation but exhibit rectifier characteristics upon stimulation by an applied electrical potential by which they may be utilized as transistors of either the point contact or junction type as will be pointed out in detail hereinafter. It will be noted that the upper ends of crystals 85 and 89 have many smaller crystals grown upon the main mono-crystal. This growth will result if the temperature of the main mono-crystal drops below the temperature for proper molecular orientation during the crystal forming process. Such structures have various desirable characteristics as, for example, photo-voltaic effects, and high time constants for memory effects.

A preferred form of the apparatus for producing cadmium sulphide crystals in accordance with the method of the present invention is illustrated in FIGURE 2. As in the apparatus illustrated in FIGURE 1, a quartz tube 98 extends through an electric furnace 100 and is provided through its inlet end with conduits 102 and 104 for introducing hydrogen and hydrogen sulphide, respectively, into the quartz tube 98. Conduit 102 is connected through a suitable control element 106 to a suitable source (not shown) of dry pure hydrogen gas and conduit 104 is connected through a suitable control element 108 to a suitable source (not shown) of dry pure hydrogen sulphide gas. A suitable quartz thermo-couple tube 110 extends centrally through the quartz tube 98 over the elongated crucible or boat 112 which contains amorphous cadmium sulphide. The thermo-couple 110 provides a means for ascertaining the temperature of the furnace immediately over the boat 112 while preventing corrosion of the thermo-couple by the H$_2$S and H$_2$. The apparatus of FIGURE 2 differs primarily from that of FIGURE 1 in the provision of a second and independently controllable electric furnace 114 beyond the boat 112 in the crystal forming zone of the quartz tube 98. If desired, a thermocouple may be provided within the crystal forming zone to permit ready and more accurate control of the temperature at that zone.

As has been indicated previously the temperature of the crystal forming zone of the furnace both during crystal growth and cooling is extremely important. In the apparatus of FIGURE 2, since it is impossible to control the temperature of the crystal forming zone independently of that at the boat 112, the temperature of the furnace 100 is raised to the temperature necessary to vaporize the amorphous cadmium sulphide in the boat 112 at the zone of the tube 98 over the boat 112, that is ordinarily to a temperature between 800 and 1000° C. but on occasions up to 1700° C. to allow the production of different types of crystals. The flow of hydrogen is controlled to prevent decomposition of the cadmium sulphide during its vaporization. The temperature of the furnace 114 is first raised to a temperature at which the vaporized cadmium sulphide can condense on the walls of the tube 98 when a temperature or gas flow fluctuation is induced to form seed crystals. After the seed crystals have formed on the wall of the tube 98, the temperature of the furnace 114 is then raised to the temperature in which the cadmium sulphide will condense on the seed crystals to produce crystal growth in monocrystalline form. While the primary purpose of introducing hydrogen sulphide into the furnace beyond the end of the boat is to prevent decomposition of the cadmium sulphide vapor, it performs the additional function of cooling the cadmium sulphide vapor at the crystal forming zone to produce condensation thereof.

By the provision of a second and independently controllable furnace, such as 114, it is thus possible to provide a much larger crystal forming zone due to the ability to provide a larger zone within the tube 98 at the temperature appropriate for seed crystal formation and also to raise the temperature of this entire zone to the appropriate temperature for monocrystalline growth. In addition, it is possible with this apparatus to readily control the rate of cooling of the crystals after complete growth has been attained and thus control the development or non-development of physical imperfections or disturbance points in the crystal. Thus if it is desired to produce a crystal with a minimum number of disturbance points, the crystals formed are cooled at a very slow rate, in the order of 4 to 48 hours, so that the electrons of the crystal will assume their correct position within the normal perfect crystal lattice structure and if it is desired to produce a crystal with many disturbance points, the crystal is cooled quite rapidly, as for example for 15 minutes to 4 hours to prevent the assumption by the electrons to their normal position within the lattice structure.

In both the apparatus of FIGURE 1 and FIGURE 2, the quantity of hydrogen at the zone of the tube 98 surrounding the boat 112 is controlled to permit ready vaporization without decomposition of the amorphous cadmium sulphide within the boat 112 and the vaporized cadmium sulphide is moved slowly by the flow of the hydrogen gas to the crystal forming zone beyond the end of the boat 112. When the gas bearing the cadmium sulphide vapor reaches the crystal forming zone it is super saturated with cadmium sulphide vapor so that the introduction of the hydrogen sulphide gas into the cadmium sulphide vapor at that zone will produce condensation of the cadmium sulphide upon the crystal seeds while such crystal seeds are maintained at a sufficiently high temperature to permit proper molecular orientation to produce crystalline growth.

In addition to the foregoing method, I have found that cadmium sulphide crystals can be produced by packing amorphous cadmium sulphide into a sealed bomb 300 such as is illustrated in FIGURE 54 of sufficient structural strength to withstand pressure up to 150 atmospheres, sealing the bomb, heating the bomb to 1700° C. or higher, and cooling the bomb very, very slowly to room temperature. With the bomb completely filled and packed with amorphous cadmium sulphide, the calmium sulphide will enter into a liquid state when heated to 1700° C. rather than subliming. This is due to the high pressure, 150 atmospheres, developed within the bomb. When the liquid cadmium sulphide is cooled sufficiently slowly from its liquid condition it will crystallize.

In addition to the foregoing methods of producing crystal growth, I have found that crystalline layers can also be produced in a furnace of this general type. Referring to FIGURE 55, a furnace assembly similar to FIGURE 1 is illustrated as comprising an electric furnace 302, a quartz tube 304, a boat 306 filled with a quantity of amorphous cadmium sulphide 308, and tubes 310 and 312 for introducing hydrogen sulphide and hydrogen as before. A smooth quartz plate 314 is demountably supported within the tube 304 above the boat 306 and the outlet end of the tube 310 is disposed at the upstream end of the boat 306 as shown. The heating and gas flow control is the same as described herein above in reference to FIGURES 1 and 2. Due to the location of the outlet end of tube 310, a relatively cool zone is provided over the face of plate 314 adjacent boat 306. The vaporized cadmium sulphide condenses in a layer upon the adjacent face of plate 314 in crystal agglomerant form. The face of the cadmium sulphide crystal agglomerant layer against the plate will conform perfectly to the surface of the plate 314 upon which it is formed. Thus if the quartz plate 314 has a highly polished face, the layer formed will have an equally smooth face. After cooling, this layer can be readily removed from the plate 314 and cut into a radiation sensitive cells of the desired size each having a perfectly smooth face.

TREATMENT OF CRYSTALS TO PRODUCE OPTIMUM DISTURBANCE POINT DENSITY AND DISTRIBUTION

As has been previously indicated, the electrical conductivity of crystals is dependent upon the presence of free electrons and/or holes within the crystal lattice structure.

When a crystal of cadmium sulphide is produced in the high degree of chemical purity indicated in the preceding section and with a nearly perfect lattice structure with a minimum of disturbance points present, the crystal is non-conductive unless subjected to radiant energy as explained by the covalent bond theories above. When such a crystal is subjected to radiant energy it becomes highly conductive due to the free electrons induced in the crystal as a result of the impingement of the radiant energy thereon. The conductivity of the crystal varies in proportion to the intensity of the radiation to which it is subjected and therefore will produce a varying electrical current bearing a high degree of conformance to the modulation of the impinging radiant energy to which the crystal is subjected. These crystals return to their non-conductive condition practically instantaneously upon termination of the impingement of the radiant energy. For example crystals of this type have accurately reproduced a light impulse of one microsecond in duration.

As previously indicated, disturbance points may be introduced into a mono-crystal by controlled cooling of the crystal in the crystal growing cycle. Rapid cooling of the crystal to room temperature from its solidification point produces disturbance points whereas relatively slow cooling of the crystal produces relatively few or no disturbance points. Once a crystal has been formed in this manner, its characteristics are stable unless intentionally modified by one of the methods described herein.

The treatment of mono-crystals to produce a particular disturbance point density and distribution is of primary importance in the preparation of transistors. In both point type and junction type transistors, it is necessary to provide zones of electron concentration (n-zones) and zones of hole concentration (p-zones).

The methods of treatment of cadmium sulphide crystals, in accordance with the present invention, to produce these distinct n-zones and p-zones are diffusion of suitable disturbance points into the crystal grid structure, ion bombardment, electro formation or welding, electrolytic etching and nuclear bombardment. These methods will now be discussed in detail.

Both n-crystals and p-crystals are formed by the methods of crystal growth described hereinabove. These crystals may be cut and assembled into n-p-n, p-n-p, or other junction type transistors by the methods described below or by a barrier layer introduced by bombardment as set forth below.

While the following discussion in terms is directed specifically to cadmium sulphide crystals, it is to be understood that the techniques described are equally applicable to crystals formed of the other semi-conductor compounds exhibiting transistor effects.

The diffusion method of introducing disturbance points into a crystal is of importance in producing p-zones of controlled depth upon a surface of an n-crystal or n-zones of controlled depth upon a surface of a p-crystal in the formation of both point type and junction type transistors.

Manufacture of n-p junctions through conversion of approximately homogeneous crystals can be achieved by diffusion of suitable disturbance points into a grid structure. The diffuser rate is accelerated by heating.

In diffusion, disturbing electrons or holes penetrate into a p- or n-semiconductor from its surface. One of the methods for introducing chemical impurities is to coat the surface with a thin homogeneous layer, by electrolysis or vacuum vaporization. Iron has been found to be ideal for this purpose. Thermal diffusion then allows penetration of disturbance points into the surface with a non-linear disturbance distribution in the p-n layer proper and a relative disturbance-poor zone of transition. This permits the manufacture of surface rectifiers with high barrier potentials without a large increase in flux resistance.

Characteristics of such cadmium sulphide crystal surface conductors resemble those of copper oxide and selenium rectifiers. However the current density is increased about a thousand times. With n-material of specific resistance greater than 5 ohm/cm., barriers for about 100 volts are achieved with flux current densities up to 500 amps/cm.$^2$. The barrier layer thus formed is in proximity to the diffusion surface. The transition zone can be measured with the aid of photo effects by scanning with a narrow light beam.

Diffusion in the manufacture of n-p layers may be supplemented by sintering together separate n- and p-crystals to produce n-p-n or p-n-p junctions as is illustrated diagrammatically in FIGURE 5. The main difficulty is to sinter a zone of transition which as far as possible is free of larger grid disturbance. In homogeneous distribution of disturbance points and in homogeneous grid structure cause structural defects which by short circuiting or trapping considerably impede the mobility or the average free frequencies of the current carriers.

In the manufacture of such junctions, first a crystal is divided into corresponding parts 120 and 122 polished and lapped so that the end dimensions fit to each other.

Thereafter, either by vacuum vaporization or electroplating, a very thin layer of suitable disturbance material is applied at the surfaces to be joined. The layer thickness is of the order of .025 to .25 mm. The surfaces thus treated are then pressed together and in a hydrogen atmosphere sintered together for several hours at temperatures up to 840–860° C. The thickness of the converted zone 124, i.e. depth of diffusion, increases with heating temperature and time, and is also dependent on the type of the diffusing material and the diffusion constant of the mono-crystal. For example, at 900° C. and for n-cadmium sulphide, the width of the p-zone after two hours of treatment is 0.15 mm. and after eighteen hours of treatment is 0.40 mm.

In order to facilitate sintering and to reduce the sintering temperature, a binder is added to the disturbing materials. The binder however is without influence upon concentration of the charged carriers. It merely facilitates the junction of the different crystal layers. For cadmium sulphide, a binder consisting of silver, tin and platinum can be used. Disturbance producing substances such as iron may also be applied with pure binders.

Arrangement of n-p-n-p layers (including a p-n hook) permits manufacture of surface transistors with current amplification. Starting with one n-type and one p-type crystal, I obtain junction surfaces to which p- or n-layers are applied, respectively. The crystals thus prepared are put together with the completed surface layers adjoining each other and joined together by sintering. Alternatively, a surface of p-type converted from an n-type crystal of minimum thickness, is reconverted to an n-type by adding excess conduction material.

The order of magnitude of the dimensions of an n-p-n transistor thus manufactured is: length 1.77 mm., width .63 mm., thickness .51 mm.

In case a very large change in disturbance concentration at p-n junctions is desired, diffusion under a considerable temperature gradient may be applied. The temperature gradient, depending upon the materials to be injected, results from ion bombardment, electro-formation or welding, or electrolytic etching. Ion bombardment produced by gas discharge may be applied to heat and thereby purify absorbed vapor or gas layers.

In ion bombardment, it is not necessary to use ions of maximum energy such as those furnished by a cyclotron because ions of lower speed can also be used to bombard the semi-conductor surface with sufficient intensity to change the concentration of disturbance points. An ionization chamber, such as that shown in FIGURE 6, at a pressure of .1 to 10 torr, produces ions passing through holes 121 in the cathode 123 into a bombardment chamber 125 and these are directed through an electric acceleration field 126 onto the semi-conductor material 128 to be treated. The anode 130, gas inlet control 132 and high vacuum pump 134 of the ion gun structure of FIGURE 6 are conventionally illustrated. The pressure in the bombardment chamber 125 should be much smaller (.1 to .001 torr) to make the average free wave length of the ion as large as possible and to prevent discharges even at high acceleration voltage. The bombarding ions may consist of different elements which do not react, at least not substantially, with the semi-conductors, for example, helium, argon, nitrogen, or ions of the disturbing substances.

If these disturbing substances are solid, they are vaporized in the anode space and directed, after ionization and acceleration, on to the semi-conductor surface. In order to permit deeper penetration, the semi-conductor to be bombarded is heated.

The effect of bombardment depends upon the mass of the incident ions, i.e. the ionized gas or material: upon the ionic energy i.e. acceleration voltage; the number of incident ions and also upon the duration of bombardment.

Since the ion mass of argon is ten times as great as that of helium, the same effect will be attained with a tenth of acceleration voltage.

The ion bombardment affects the semi-conductor surface in a way similar to densification or shock hardening.

In cadmium sulphide the bombarded surface is about 600 A. deeper than the unbombarded surface. Bombarded cadmium sulphide shows a substantially higher barrier voltage or larger flux current, and also a higher photo-effect.

Densification of the crystal surface is also proven by the poor diffusion of iron into bombarded cadmium sulphide. Normally iron diffuses easily into an undisturbed cadmium sulphide grid. Surface resistance of cadmium sulphide decreases with increasing duration of bombardment. Cadmium sulphide surface rectifiers may be manufactured by first subjecting p-type cadmium sulphide with bombardment of helium ions. In this way vaporization of iron traces in the grid serves to purify the surface. Thereafter, addition of another material produces a superficial n-zone and thereby the desired p-n junctions are achieved.

Electroformation or welding as illustrated in FIGURES 7 and 7A is applied especially to point contacts. The resulting high current amplification of point transistors is based upon a diffusion effect combining a high temperature gradient with an electric field effect. Current amplification factors up to 10 are explained by a p-n hook.

As illustrated in FIGURES 7 and 7A, by suitably alloying the needle points 138 with disturbing material producing conductivity, during formation and heating of the point and of the regions of the crystal 140 below that point, a combined welding and diffusion process occurs. This is due to the high resistance in the current constricted region of metal point/n-type semi-conductor; almost the entire formation and energy is transformed into heat. Thereby the superficial p-layer travels off and a n-conductive surface layer will occur directly below the needle point as is shown in FIGURE 7A; the valence disturbance points existing in the point material will diffuse.

Chemical etching may produce transistor effects similar to those of electric double layers by forming thin p-conductive surface layers.

Nuclear bombardment also causes considerable improvement in the semi-conductor properties. When treated with a uranium burner, fast neutrons produce grid defects by which n-germanium is converted into p-type. Prolonged heating at 600° C. can reduce these grid defects if desired.

Slow neutrons due to nuclear transformation can produce new disturbance points.

Under nuclear bombardment with a uranium burner, the contribution of disturbance points produced by slow neutron capture is negligibly small compared to the grid disturbances produced by fast neutrons.

Bombardment by alpha particles from polonium causes cadmium sulphide conversion from n- to p-type. However, at 5 mev., the penetration depth is only about .02 mm. Deuteron bombardment also acts like neutron bombardment because in the crystal there is a decomposition of the neutrons into protons and neutrons. While the protons are captured by the nuclei of the grid elements, the neutrons cause the above mentioned effects.

The actual application of the crystal modification techniques described above to form junction type transistors will now be explained in reference to FIGURES 56 through 60.

In FIGURE 56 is illustrated a crystal cut into two segments 316 and 318, the mating faces 320 and 322 of which are appropriately lapped. Assuming that this crystal is an n-type crystal, a p-zone will be introduced into the crystal fragments 316 and 318 through the surfaces 320 and 322 respectively to form thin p-layers 324 and 326 illustrated in FIGURE 57 respectively. The two crystals 316 and 318 are then sintered together to form a unitary n-p-n junction type transistor as illustrated in FIGURE 57. A p-n-p type transistor can be formed by appropriate treatment of a p-type crystal.

If it is desired to form a five zone junction type transistor, it is merely necessary to modify the opposite end faces of the crystal fragments 316 and 318 so that each crystal fragment will be in effect a p-n-p crystal and then join the two crystal fragments at their mating faces 320 and 322 to form a unitary crystal structure as illustrated in FIGURE 58 in which the extreme end regions of the assembled crystal are p-zones and the region at the abutting faces is a p-zone separated from each end p-zones thus forming a p-n-p-n-p junction type transistor.

FIGURE 59 illustrates the treatment of the longitudinal faces of a crystal to form a large area junction type transistor of high current capacity. For example, if the crystal is an n-crystal, the opposite longitudinal faces will be treated to form p-zones designated 330 and 332 in the drawing separated by an n-zone 334.

If it is desired to form an intermediate zone within a single crystal of opposite characteristics to the body of the crystal, a zone of disturbance points 336 can be introduced centrally into the crystal by the bombardment techniques hereinbefore described. For example, using an n-crystal, appropriate bombardment of the central portion of the crystal will produce a p-zone intermediate two extreme n-zones designated 338 and 340 respectively.

From the foregoing explanation it is apparent that these techniques can be utilized to form junction type transistors of any number of zones as determined by the requirements of the particular application.

UNIT MOUNTING

As has been previously indicated, it is among the important objects of this invention to provide new and improved mountings for radiation sensitive and semi-conductor elements for facilitating their handling and manufacturing and assembling operations and to provide simple compact units requiring a minimum space.

FIGURE 8 illustrates, in an enlarged view, a compact mounting of a radiation sensitive crystal formed in accordance with the principles hereinbefore set forth whereby such radiation sensitive crystal forms a small compact radiation sensitive unit adapted to be connected in an electrical circuit as needed. In this unit, the crystal 342 is resiliently biased into abutting relation with a sheet of conductive glass 344 by a compressed spring 346 compressed between the end wall of a plastic housing 348 and a contact member 350 abutting against the opposite face of the crystal 342. The plastic housing 348 is formed with side walls extending in surrounding relation to the crystal 342 and the conductive glass plate 344 to form a unitary assembly. One electrical contact is formed by a pin 352 affixed to the member 350 and the other contact is formed to the opposite face of the crystal 342 through the conductive glass 344, a surrounding continuous metallic member 354 in electrical contact with the inner face of the glass plate 344 to a lead wire 356. So long as the crystal 342 is not subjected to radiation through the glass plate 344 no current will flow between the lead 356 and the lead connection 352. When the crystal 342 is excited by radiant energy passing through the glass 344 high current will flow from the lead wire 356 through the member 354, the conductive glass plate 344, through the crystal 342, the contact member 350 to the pin 352.

FIGURE 9 and FIGURE 10 illustrate a photo-transistor unit and its adaption for plugable mounting. The photo-sensitive transistor crystal 360, formed in accordance with the methods hereinbefore set forth, is mounted upon a base contact 362 in aligned relationship with a lens 364 positioned to focus light upon the crystal 360. Contact wires 366 and 368 form emitter and collector contacts to the crystal 360 and are electrically connected to the contact prongs 370 and 372 respectively. As is illustrated in FIGURE 10, this entire assembly forms a three prong unit in which the prongs 370, 372 and 374 are adapted to interfit with a socket 376 to the prongs of which suitable wires can be connected.

While the remaining mountings hereindescribed are not adapted for plugable mounting, it is readily apparent that they can be mounted within a suitable body structure adapted by the provision of suitable prongs for plugable mounting in a circuit by utilizing the principles of the mounting arrangement of FIGURES 9 and 10.

The radiation sensitive cell illustrated in FIGURES 11 and 12 is formed of a carrier 200 upon one surface of which has been deposited a thin layer of crystallitic cadmium sulphide 202 in the manner previously described under the heading Evaporated Coatings. To provide good electrical contact at the opposite ends of this coating 202, I have provided a strip of conductive paint 204 with which a contact lead wire 206 can make good electrical contact. The coated face of the carrier 200 is then covered to prevent damage thereof with a suitable plastic covering layer 208, which, in the disclosed embodiment, is polymerized methyl methacrylate, better known by the name Lucite. In this cell, the carrier 200 is preferably formed of a hard non-conductive transparent glass. Radiant energy can thus readily impinge upon the coating 202 either through the transparent lucite protective layer 208 or through the carrier 200.

When small radiation sensitive units are desired, I have found that such units of substantially uniform radiation responsive characteristics can be provided by forming an evaporated coating in the manner previously described upon a relatively large sheet or carrier, as illustrated in FIGURE 13, and covering the coated sheet with a layer of protective plastic, such as Lucite. The coated sheet 210 is then cut into blocks 212 as indicated by the phantom lines 214, to provide a plurality of small independent radiation sensitive units. These units 212, as is illustrated in FIGURES 14 and 15, are readily adapted for use as electrical circuit components by the provision of an electrical contact at opposite edges of the crystallitic layer 216 between the carrier 218 and the transparent coating 220 by the provision of layers of conductive paint 222 and 224 to which contact wires 226 may be attached. Since the cadmium sulphide crystallitic coating layer 216 is of substantially uniform density over the entire sheet when produced by the method herein before described, each of the photocell units thus formed is of substantially identical electrical characteristics.

In FIGURE 16 is illustrated a radiation sensitive cell in which a plate-like semi-conductive mono-crystal 228 forms the radiation sensitive element. In this mounting, the crystal 228, which is preferably formed of cadmium sulphide in the manner previously discussed herein, is mounted upon a transparent base 230, preferably formed of hard glass and electrical lead wires 232 and 234, provide electrical connections through the use of a conductor paint, if necessary, to the opposite ends of the crystal 228. The entire assembly is protected by a layer 236 of a suitable protecting plastic such as Lucite. In this form of the invention, the crystal 228 may be subjected to radiation passing through either the Lucite layer 236 or through the transparent glass carrier 230.

FIGURE 17 illustrates a modification of the structure of FIGURE 16 consisting of a carrier 238, a cadmium sulphide mono-crystal 240, electrical connections 242 and 244, and a plastic protective layer 246. The modification of this form of the invention consists of the provision of a reflecting means such as a mirror 248 behind the mono-crystal 240 so that light passing through the transparent glass carrier 238 and through the transparent mono-crystal 240 will be reflected by the mirror 248 back into the crystal 240, thereby substantially doubling the sensitivity of the crystal 240 to a given quantum of radiant energy.

Reflecting means may be used with any of the radiation sensitive cells herein described whether such cell be a crystal or an evaporated coating. The reflecting means may take the form of any surface which will reflect the radiation being detected. For light, ultra-violet radiation, etc., sliver, gold and aluminum placed on the crystal in the form of a foil, an evaporated coating or by electroplating, form excellent reflectors.

The material forming the window through which the radiation passes to the crystal or evaporated radiation sensitive layer, has been indicated herein generally as glass to permit the transmission of visible radiation. It is apparent that the material of the window will be varied to permit the transmission of the radiation which the unit is adapted to sense and that the radiation sensitive element will be shielded and appropriate filters will be provided to the end that only the band or bands of radiation which it is desired to sense can impinge upon the radiation sensitive element. The necessary filtering and shielding techniques are all well known and need not be described herein.

In the crystal mounting shown in FIGURE 18, a semi-conductive mono-crystal 250 is placed upon a carrier 252 formed of a transparent electrically conductive substance such as the conductive glass which is generally available and the electrical contacts 254 and 256 are provided respectively to the face of the crystal 250 opposite that on which it contacts the carrier 252 and to the carrier 252. Again the crystal is shielded by a layer 258 of a protective plastic such as Lucite. In this form of the invention, radiant energy passes through the conductive glass 252 and impinges upon the crystal 250. By this construction, a high current carrying capacity cell is readily provided due to the large area of electrical contact between the crystal 250 and the conductive carrier 252. This construction can likewise be modified by the provision of a reflecting means as in the unit illustrated in FIGURE 17.

FIGURE 19 illustrates a mounting of a semi-conductive mono-crystal 260 treated in the manner previously described for use as a point type transistor. In this construction, the base contact to the transistor mono-crystal 260 is made by the carrier 262 which is formed of conductive glass and to which an electrical lead 264 is provided. The crystal 260 is shielded by a protective layer 266 of a suitable plastic. Emitter and collector contacts 268 and 270 respectively, are inserted through the protective layer 266 into contact with the crystal 260 to contact the crystal 260 at spaced points in the conventional manner. While the spacing between the contacts 268 and 270, as illustrated, is relatively large, it will be recognized by that the illustration of FIGURE 19 is on a greatly enlarged scale. The actual spacing between the contacts 268 and 270 is the conventional spacing in the order of two-thousandths of an inch.

In FIGURES 20 and 21, I have illustrated a further method of providing radiation sensitive cells of substantially uniform characteristics. FIGURE 20 illustrates a cadmium sulphidte mono-crystal 272, having a minimum number of disturbance points throughout its lattice structure, which has been enveloped or cast in a body 274 of polymerized methyl methacrylate. After the completion of the polymerization, the assembly thus formed can be cut into units, as along the planes 276 extending generally transverse to the longitudinal axis of the crystal 272, to form discrete units suitable for use as radiation sensitive cells. FIGURE 21 illustrates one of such cells which has been provided at opposite faces with a layer of conductive paint 278 to permit electrical connection to lead wires 280. It is apparent that radiation will readily pass through the Lucite body 272 for excitation thereof.

Similar techniques may be applied in the construction of transistor cells as is illustrated in FIGURES 22 and 23. In the provision of a transistor, a cadmium sulphide crystal 282, having a suitable disturbance point density and distribution, is cast in a body 284 of polymerized methyl methacrylate. Prior to so enveloping the crystal 282, a layer 286 of conductive paint of other suitable material is provided on one face of the crystal 282. Again the assembly thus formed can be cut into distinct units along the generally transverse planes 288 to form unitary transistor assemblies, which, as illustrated in FIGURE 23, are provided with suitable electrical contacts including a lead wire 290 to the conductive layer 286 to form a base contact, and spaced emitter and collector contacts 292 and 294 respectively.

SEMI-CONDUCTOR COMPOUND TRANSISTOR APPLICATIONS

The following discussion is directed to various types of electrical circuits in which the transistor effect of semi-conductor compound type crystals may be used. Semi-conductor compound type crystals when used as transistors in these circuits provide circuits which are more highly stable than any heretofore produced.

FIGURE 26 illustrates diagrammatically a simple amplifier circuit of a junction type transistor. This junction type transistor 380 is formed with an n-type emitter 382, a p-type barrier layer 384 and an n-type collector 386.

Battery 388 imposes a negative to positive potential between the emitter 382 and the barrier layer 384 and battery 390 imposes a higher negative to positive potential between the barrier layer 384 and the collector 386. An input signal is imposed through the transformer 392 which is amplified by this transistor circuit, the output being taken off from the secondary winding of the transformer 394.

FIGURE 27 illustrates a similar amplifier circuit utilizing a point type transistor, a positive to negatve potential being applied by the battery 396 between the emitter contact 398 and the base contact 400 and a positive to negative potential being applied by the battery 402 between the base 400 and the collector contact 404. An input signal is imposed upon the emitter base circuit by any suitable means 406 which signal is amplified by the transistor circuit and appears in amplified form across the load resistor 408.

FIGURES 28, 29, 30 and 31 illustrate various transistor circuits. For example, FIGURE 28 illustrates the inductive coupling between the output of a first stage transistor amplifier 410 through an air core transformer 412 to the input of a p-type second stage transistor 414 which is in turn connected to an output transformer 416. FIGURE 31 illustrates the direct coupling between an n-type transistor 418 and a p-type transistor 420, FIGURE 30 illustrates the inductive coupling through a transformer 422 between an n-type transistor 424 and a p-type transistor 426 for transmission of a signal between the input terminals 428 and the output terminals 430. FIGURE 31 illustrates the resistive coupling between an n-type transistor 432 and a p-type transistor 434 across a variable load resistor 436 to permit transmission of an input signal from the input terminals 438 to the output terminals 440.

Figure 32:
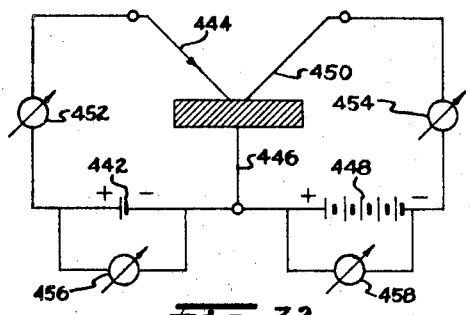
FIGURE 32 is a diagrammatic illustration of an N-type point transistor circuit.

FIGURE 32 illustrates the connection for testing of an n-type transistor having a battery 442 connected between the emitter 444 and the base contact 446 and a high voltage battery 448 connected between the base contact 446 and the collector contact 450. Milliammeters 452 and 454 are interposed respectively in the emitter and collector circuits and voltmeters 456 and 458 are connected across the batteries 442 and 448 respectively to indicate the voltage applied to the emitter and collector circuits respectively.

Figure 33:
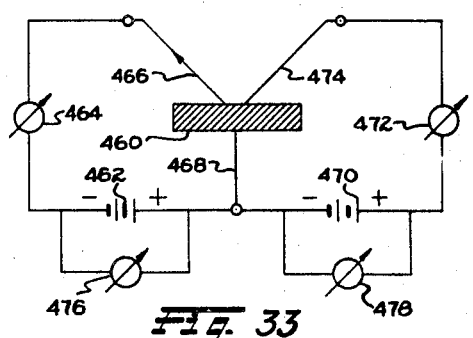
FIGURE 33 is a diagrammatic illustration of a P-type point transistor circuit.
Figure 34:
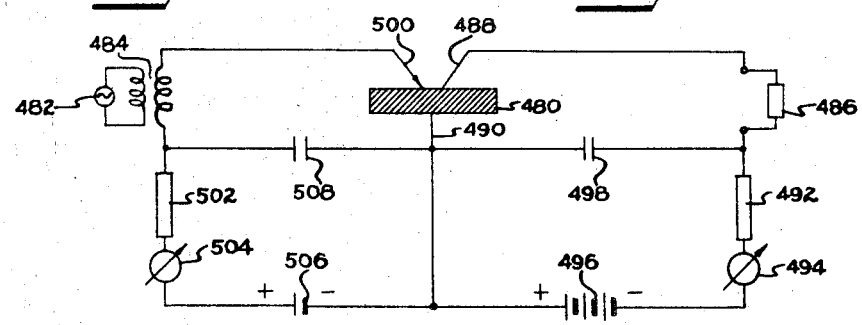
FIGURE 34 is a diagrammatic illustration of an improved transistor amplifier circuit.

FIGURE 33 illustrates a similar arrangement for a p-type transistor 460 in which a battery 462 and milliammeter 464 are serially connected in the circuit between the emitter 466 and the base contact 468 and in which a high voltage battery 470 and a milliammeter 472 are connected in a series between the collector contact 474 and the base contact 468. Voltmeters 476 and 478 are connected across the batteries 462 and 470 respectively to provide an indication of the voltage applied to the emitter and collector circuits respectively.

FIGUE 34 illustrates a simple single stage amplifier circuit utilizing a point type transistor 480 of the p-type, an input signal being applied to the emitter circuit from a signal generator 482 through the transformer 484. The output signal appears across the load 486 in the circuit between the collector 488 and the base 490 through the protecting resistor 492, the milliammeter 494, the battery 496. A capacitor 498 is connected between the base contact 490 and the point intermediate the load 486 and the protecting resistor 492. Similarly the secondary winding of the transformer 484 is interposed in the circuit between the emitter 500 and the base contact 490 in series with a protecting resistor 502, a milliammeter 504 and the battery 506, a capacitor 508 being connected from the base contact 490 to a point intermediate the resistor 502 and the secondary winding of the transformer 484.

Figure 35:
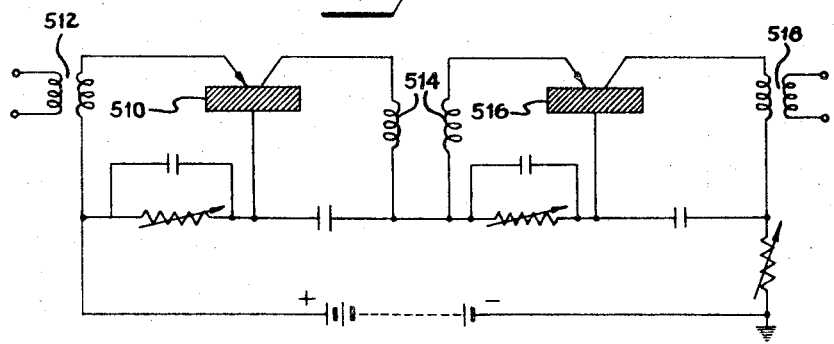
FIGURE 35 illustrates an improved transformer coupling between transistor circuits.

FIGURE 35 illustrates a two-stage amplifier arrangement in which transformer coupling between the first and second stages is utilized. An input signal is applied to the emitter circuit of the first stage transistor 510 through an input transformer 512 and the amplified signal appearing in the collector circuit of the first stage transistor 510 is coupled through transformer 514 to the input circuit of the second stage transistor 516 where further amplification occurs and the output signal appears across the secondary winding terminals of the output transformer 518.

Figure 36:
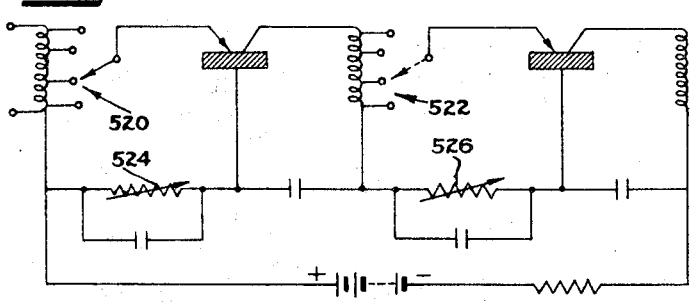
FIGURE 36 illustrates a variable impedance coupling of transistor circuits.

FIGURE 36 illustrates a circuit somewhat similar to that of FIGURE 35 but in which variable tap inductances 520 and 522 have been substituted for the input transformer to the first stage of the circuit of FIGURE 35 and the inter-stage transformer 514. It should be noted that the resistances 524 and 526 serve to polarize the emitter without the use of an additional voltage source.

Figure 37:
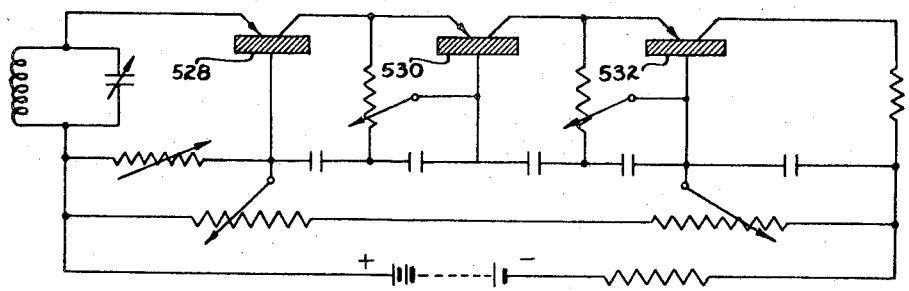
FIGURE 37 illustrates resistance coupling of transistors.

FIGURE 37 illustrates resistance coupling of transistor circuits, variable resistance coupling being provided between the first stage transistor 528 and a second stage transistor 530 and similarly provided between the second stage transistor 530 and the third stage transistor 532. While the use of resistance coupling in the manner illustrated in FIGURE 36 will result in a loss of gain, in certain applications the simplicity of the circuit resulting may justify this loss in gain.

Figure 38:
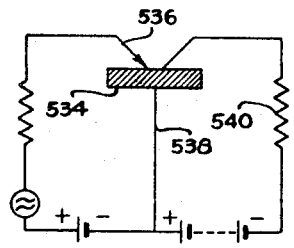
Figure 39:
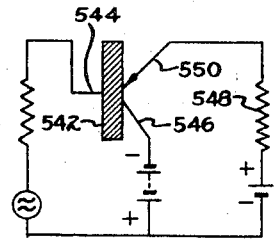
Figure 40:
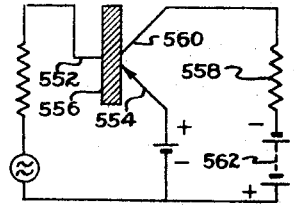

FIGURES 38, 39 and 40 illustrate several ways in which transistors may be coupled in a circuit. FIGURE 38 illustrates the application of an applied signal to the transistor 534 in the circuit between the emitter 536 and the base contact 538 and in which the amplified signal appears across the load resistor 540. This is an equivalent of a grounded grid triode type vacuum tube.

FIGURE 39 illustrates the application of an input signal to a transistor 542 in the circuit between the base contact 544 and the collector 546 and in which the output signal appears across the load resistor 548 in the circuit between the emitter contact 550 and the source of potential. This circuit is the equivalent of a cathode follower type circuit utilizing a triode.

FIGURE 40 illustrates the application of an input signal the circuit between the base contact 552 and the emitter contact 554 of a transistor 556 and in which the output signal appears across the load resistor 558 in the circuit between the collector 560 and the power source 562. This circuit is therefore the equivalent of the grounded cathode triode.

Figure 41:
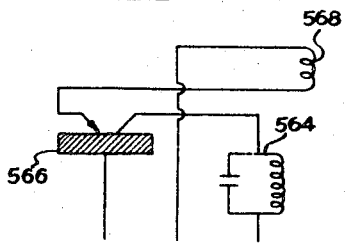
FIGURES 41, 42 and 43 illustrate typical oscillator circuits utilizing semi-conductor compound type transistors.
Figure 42:
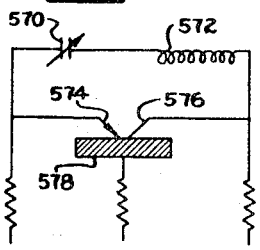
Figure 43:
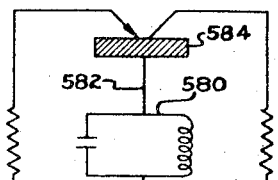

FIGURES 41, 42 and 43 illustrate various oscillator circuits in which transistors may be applied. FIGURE 41 shows a parallel resonant circuit 564 interposed in the collector circuit of the transistor 566 from which voltage is fed back through the coil 568 which is inductively coupled to the parallel resonant circuit 564 and which is in series with the emitter circuit of the transistor 566.

FIGURE 42 illustrates an oscillator in which a tuned series resonant circuit formed of capacitor 570 and inductance 572 connected between the emitter 574 and the collector 576 of the transistor 478.

FIGURE 43 illustrates an oscillator in which a tuned parallel resonant circuit 580 is provided in the circuit to the base contact 582 of the transistor 584.

Figure 44:
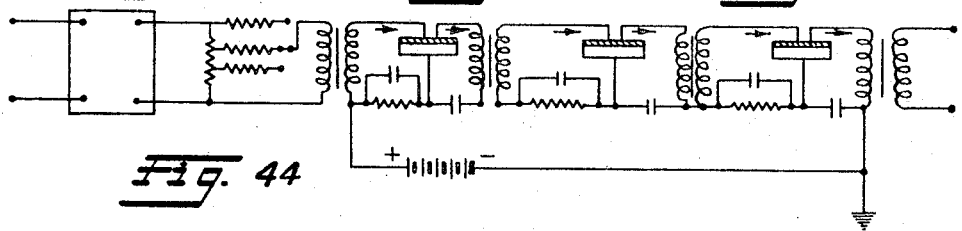
FIGURE 44 illustrates a telephone repeater circuit utilizing semi-conductor compound type transistors.

FIGURE 44 illustrates a telephone repeater circuit showing the application of a transistor in such circuit. A circuit of this type will consume .9 of a watt as compared with an equivalent pentode type repeater circuit which would require four watts of power.

Figure 45:
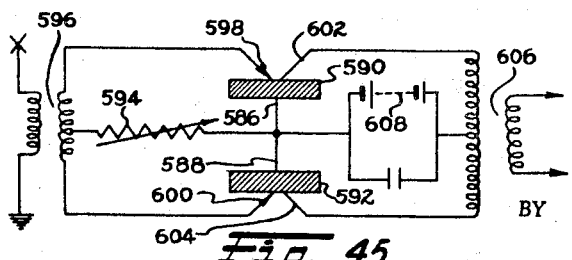
FIGURE 45 illustrates a push-pull amplifier circuit utilizing semi-conductor compound type transistors.

FIGURE 45 illustrates a push-pull amplifier arrangement of a transistor circuit. In this circuit, the base contacts 586 and 588 of the transistors 590 and 592 are connected together and are connected through a variable resistor 594 to the center tap of the secondary winding of an input transformer 596. The opposite extremities of the secondary winding of the transformer 596 are connected to the emitter contacts 598 and 600 of the transistors 590 and 592 respectively. The collector contacts 602 and 604 are connected to the opposite ends of the primary winding of the output transformer 606, the center tap of which is connected through the power supply 608 to the common connection of the base contacts 586 and 588. The output signal appears across the secondary winding of the transformer 606.

RADIATION SENSITIVE COMPOUND TYPE CELL APPLICATIONS

FIGURES 46 and the following illustrate various applications of the radiation sensitive crystals formed in accordance with the present invention. As has been previously indicated, these crystals are sensitive to radiation from wave lengths in the cosmic ray region, alpha, beta and gamma, through the ultra-violet radiation region and through the visible light radiation. It is to be understood that, as has been hereinbefore pointed out, each of the radiation sensitive crystals is provided with appropriate shields and filters to render it responsive to the particular range of frequencies to which it is intended to respond and prevent response to extraneous radiation to which it may be subjected as has hereinbefore been indicated.

FIGURE 46 illustrates a simple system utilizing a radiation sensitive crystal of the present invention in combination with a source of light such as an incandescent lamp 601 which is connected to a power supply 603 through a suitable switch 605. The energy from the source 601 may be focused upon the cells 607 by a suitable lens, as for example a quartz lens 609. The cell 607 functions as a valve which, so long as no radiant energy is impinging upon it, will prevent an almost infinite resistance in the circuit formed by the battery 610 and the load 612. The quantity of radiant energy impinging upon the cells 607 can be varied either by varying the output of the source by operation of the switch 605 or by passing a body such as the shutter 614 between the source 601 and the cell 607 to reduce or prevent the passage of radiation between the source and the cell.

It is to be understood that the shutter 614 is exemplary of any body which may interrupt or modulate the beam of light from the lamp 601. For example, the body may be that of an individual, a vehicle, etc. Similarly, the body may be any shutter or equivalent which normally blocks the beam between the source and the sensitive cell and which, upon the occurrence of some event, will be automatically removed from the path of the beam to thereby render the cell 607 conductive.

The load 612 represents any circuit component or controlled circuit which, upon passage of current by the cell 607 or upon termination of such current passage by cell 607, will perform a function. For example, load 612 may be a simple impulse counter, a transmitter circuit, a relay, an amplifier or similar function performing devices.

The source of radiant energy can take numerous forms, as for example, strontium 90, polonium, uranium 238 or tritiated stilbene.

Since the nature of tritiated stilbene isn't widely known, it is believed that a brief explanation will be helpful. Tritiated stilbene is formed by incorporating tritium directly into stilbene so that the emanation from tritium causes the stilbene to fluoresce. The emitted light remains relatively constant for long periods of time. Most of the light emitted by the stilbene is in the ultra-violet region, the maximum emission peak being about 3800 A. This tritiated stilbene may be obtained packaged in a Lucite button of any desired size and can be obtained with the same relative light output as a radium activated zinc sulphide phosphor of twelve microlamberts.

A device employing a radiation sensitive compound type crystal of the type herein described in combination with a self-contained power source, such as the above, is illustrated in FIGURE 49 wherein block 616 represents a self-contained radiant source, 618 represents the radiation sensitive cell, 620 represents the load controlled by the cell 618, and 622 represents the power supply for the load circuit which may be either alternating or direct current depending upon the characteristics of the load. While a radiation sensitive compound type crystal is the preferred radiation sensitive element, in its broader aspects, the present invention contemplates the use of any cell for this application.

The applications of the unit indicated in FIGURE 49 for use by the Armed Forces, particularly in front line action, are believed to be highly important. For example, the self-contained energy source 616 could be placed at one side of the road and the unit containing the cell 618 placed at the opposite side of the road to form a monitoring station for indicating the passage of personnel or vehicles along the road. The modulation of the beam passing between the source 616 and the crystal 618 by the interruption of that beam by the passage of a vehicle or a person would be reflected in the current passing through the load, which, upon interruption of the beam, will be reduced to zero. The load 620 can take any suitable form, as for example an extremely low power consuming transmitter which is rendered operative only upon termination of the stimulation of the crystal 618 by the source 616, a simple indicator, control relay, etc.

A further application of the device shown in FIGURE 49 is for distance determinations. For example, if it is desired to determine the depth of a body of water, a self-contained radiant energy source emitting, for example, ultra-violet radiation, of predetermined strength can be dropped to the bottom of the body of water. The strength of the radiant energy on the surface of the water, as sensed by a radiation sensitive crystal of the type hereinbefore described and as indicated by an appropriate indicator, will be proportioned to the distance between the radiant energy source and the crystal and therefore the depth of the water.

FIGURES 47 and 48 illustrate the utilization of the radiation sensitive cells of the present invention for sensing a sound track formed on a motion picture film in the conventional manner. Referring to FIGURE 47, radiant energy is provided by an incandescent lamp 624 energized by a battery 626 and controlled by a suitable switch 628. The light from the source 624 is directed through suitable lenses 630 and 632 upon the radiation sensitive cells 634. 636 represents a conventional film strip having a sound track formed thereto interposed in the path of the light between the lenses 630 and 632 to modulate the light beam in accordance with the sound recorded on such sound track. The cell 634 is connected to a power supply 638 and to the input of an amplifier 640 which may in the conventional manner feed the coil 642 of a loudspeaker 644.

The primary advantages of the use of the radiation sensitive compound type crystals of the type herein described for this purpose reside in the fact that the radiant energy source 624 need be of only an extremely low power output, thus permitting use of a very small bulb for example; in the fact that the radiation sensitive cell 634 is extremely small, as for example the size of a small button; and in the fact that such radiation sensitive cell produces an extremely large variation in the current flowing in the circuit in which it is connected in response to a slight variation in the radiant energy impinging thereon thus providing a large amplitude input voltage to the amplifier 640. With cells of this type, very little further amplification of the electric signal is necessary to drive a load such as a speaker coil 642 for normal output.

It is of course to be recognized that while a conventional sound track 636 has been shown as the modulating medium for controlling the light beam, any suitable modulating media may be used. It is likewise to be noted that while the illustrated load is a speaker coil 642, of the speaker 644, any suitable load may be substituted, as for example, the output of amplifier 640 may be used to modulate an oscillator feeding a transmitter or the amplifier 640 may be used to feed a recording element of a magnetic recorder or the like.

FIGURE 48 represents a device similar to that shown in FIGURE 47 with the exception that a self-contained radiant energy source 650 is substituted for the externally powered source 624 shown in FIGURE 47. This self-contained radiant energy source may be any source such as that described in reference to FIGURE 49 hereinabove. For simplicity, the remaining elements have been given the same reference numerals as those of FIGURE 47. In addition to the advantages hereinbefore set forth as to this device in reference to FIGURE 47, this modification has the further advantage in providing an extremely small compact self-contained radiant energy source thereby eliminating any need of an external power supply to the radiant energy source and its coaction with an extremely small radiation sensitive cell 634 which can sense the radiation from the source 650 as modulated by the sound track of the film strip 636. Thus the large, bulky elements hereinbefore used for sensing sound tracks or other such energy beam modulating media can be entirely eliminated.

A device by which the radiation sensitive cells of the present invention may be used as a radiant energy detector is illustrated in FIGURE 50. The device 652 may take the form of a probe for searching for the presence of radio-active material in a mass or may be used in any way as a substitute for Geiger counters and the like. The probe 652 comprises a radiation sensitive compound type cell of the type herein described in detail and designated 654 connected in series with a power supply 656 and an indicator 658. A screen 659, which will fluoresce in response to stimulation by radiant energy emission from radio-active material is mounted within the probe in front of the crystal 654. This screen 659 functions as a radiant energy wave length converter for converting detected energy into energy of wave lengths to which the crystal is sensitive and may be a screen or crystal of naphthalene, anthracene, chrysene, stilbene, a zinc sulphide single crystal or similiar substances which fluoroesce in response to radiant energy received from an radio-active source. The indicator 658 may take any suitable form to produce a signal in response to a change in the conductivity of the crystal as for example a counting mechanism, a simple meter, or a transmitting unit. This unit, due to the smallness of the components, may be made very economically and compactly to provide a direct indication of the quantity of radiant energy to which it is subjected. Through the characteristics of the radiation sensitive crystals hereinbefore described, the device 652 is extremely sensitive to stimulation by radiant energy and provides an accurate indication of the amount of radiation to which it is subjected. For many applications, it will not be necessary to provide the screen 659 for conversion of the energy from one wave length of radiation to another but the crystal 654 may be used to sense the presence of radiation directly.

In FIGURE 51, I have illustrated a device which may be used as a self-powered monitoring unit for determining the presence of radio-active material in a particular geographic zone. This unit, due to its construction is of extremely long life so that it can be used as an unsupervised monitor at any suitable station for providing a signal to a remote receiving station upon sensing of a particular type of radiation by the monitor or it may be utilized as an expendible unit which could be dropped by aircraft into an area which may be contaminated by radio-active material. This unit 660 comprises a screen 662 such as that described in reference to FIGURE 50, a radiation sensitive crystal 664 constructed in accordance with the principles of the present invention, a transmitter unit 666 utilizing transistor components and modulated by the signal applied from the crystal 664 and feeding an antenna 668 and a self sufficient power supply. The power supply for the unit 660 may be a conventional small mercury button type battery which will have long life due to the extremely low power used by the transmitter 666 which is completely cut off except when activated by the crystal 664 in response to the sensing of radiant energy. In the illustrated embodiment of this invention, the power supply is a self-contained unit consisting of a radiant source 670 of the type described hereinabove in reference to FIGURES 48 and 49, a screen 672 similar to those designated 659 and 662 when necessary for producing fluorescence for conversion to a suitable wave length radiation, and a voltage generator type photocell 674 which when stimulated by radiation from the screen 672, which in turn is responsive to stimulation by the radiant source 670, will produce an electrical voltage across the terminals 676 for operating the transmitter 666 in applying potential across the crystals 664. Such voltage generator type cells are well known in the art, one example being found in a conventional lightmeter for photographic use.

The unit 660 when dropped in an area of possible contamination, will if stimulated by radiation from radio-active material transmit a signal which may be sensed by a receiver at a remote position either in an aircraft or at a ground station. So long as the crystal 664 is not stimulated by the presence of radiant energy of the wave length for which it is filtered, the power consumption of the transmitter will be practically zero.

FIGURE 61 illustrates the application of the combination of the small self-contained radiant energy source such as has been described hereinabove in reference to FIGURES 48 and 49 and the small radiation sensitive crystals formed in accordance with the teachings of the present invention for the purpose of forming a voice modulated transmitter which would be extremely small and could be readily used by the Armed Forces as a replacement for transmitters such as the well-known "Walkie-Talkie" and other units now in use.

As is shown in FIGURE 61, the radiant energy from the source 680 of the type hereinbefore described in reference to FIGURES 48 and 49, is focused upon a crystal 682 having radiation sensitive characteristics and formed in accordance with the principles hereinbefore set forth by suitable quartz lenses 684 and 686. The crystal 682 is shown as controlling the voltage applied to an amplifier 688 feeding a transmitter 690. The amplifier 688 and transmitter 690 are preferably formed of the small compact transistor circuits hereinbefore described. The radiant beam between the lenses 686 and 684 is modulated by a light valve 692 controlled by a suitable self-powered microphone 694 of the type now well known in the art. The light valve 692 may take any suitable form such as the "Kerr" cell, a ribbon type valve, or a mirror galvanometer. The necessary characteristics of the light valve 692 are, of course, low power requirements and accurate response to the modulating signal from the self-powered microphone 694.

The unit shown in FIGURE 61, due to the infinite impedance of the cell 682 when not stimulated by radiant energy, has no power consumption except when actually in operation, thereby providing for extremely long life of the unit.

The radiation sensitive crystals formed of pure compounds, the atoms of the elements of which are held together in a crystalline lattice exclusively by covalent bonds when formed with no detectable disturbance points exhibit the characteristics of storing a charge or quantity of energy when stimulated by a beam of radiant energy or an electron beam from a suitable electron gun. Thus a large crystal can be subjected to a beam of radiant energy in discrete spots. This principle may be used to form a storage cell for use, as for example, in an electronic calculating mechanism. The stored signal formed on a crystal in this manner may be sensed without erasure or may be eliminated by quenching as for example with infrared radiation.

In addition to the foregoing effects, a radiation sensitive compound type crystal of this type exhibits the property of integrating with respect to time the amplitude of radiation to which it is exposed if it is not connected across a voltage source at the time that the radiant energy strikes the crystal. This principle is illustrated in FIGURE 62. In FIGURE 62, radiant energy from a radiant energy source 696 is focused by a quartz lens 698 upon a radiation sensitive compound type crystal 700 which is connected between the grid 702 and the cathode 704 of a thyratron type tube 706. The plate 708 of the tube 706 is connected through a suitable load, as for example a relay coil 710, to a positive voltage as that produced by the battery 712. The bias applied to the thyratron type tube 706 is such that it is normally maintained in its non-conducting condition. The radiation sensitive cell 700 is so connected between the grid 702 and the cathode 704 of the tube 706 that as the charge on the cell 700, which is proportional to the total radiation to which it is subjected, increases with time, the difference in potential across the cell 700 will be sufficient to overcome the biasing potential upon the tube 706 to permit firing thereof and energization of the relay coil 710. It is thus seen that the chemically pure perfect crystals will function in effect as a "photo-capacitor." Thus series of light impulses striking the cell 700 will gradually build up the charge on the cell until the charge reaches a predetermined selected point at which it can be discharged to return to its initial condition. This principle may be used to form a step wave generator if the cell is subjected to impulses of light or a sawtooth generator if the cell is submitted to a continuous beam of light of constant intensity.

As has hereinbefore been indicated the radiation sensitive cells may be used as a detector for determining the quantity of radiation within a given vicinity. This principle may be used either as an on-off control or as a modulating control. For example, in FIGURE 62, the cell 700 could be used for medical purposes in controlling radiant energy therapy. Thus the cell appropriately filtered to be sensitive to X-ray radiation could be utilized in the circuit of FIGURE 62 to control a relay which, after the patient had been subjected to a predetermined quantity of X-ray radiation, would turn off the X-ray machine. If it is desired to control by modulation the intensity of radiation striking an object, without controlling the source of such energy, the device illustrated in FIGURE 63 may be used. For this purpose, a crystal 714, which may be used with or without a radiation wave length converting screen 716 in accordance with the type of radiation used, is mounted adjacent the object on which it is desired to control the quantity of radiation. The crystal 714 is connected to an amplifier 718 which feeds a control circuit 720 to generate a voltage in proportion to the radiation to which the crystal 714 is subject which voltage will appear across the output terminals 722, 724 in appropriate polarity to control the actuation of a suitable radiation valve 726 to vary the radiation impinging upon the crystal 714. For example if the radiation impinging upon the crystal 714 rises above a preselected norm, a voltage will be produced across the terminals 722 and 724, to control the radiation valve 726 to reduce the quantity of radiation passing to the quartz crystal 728 until the radiation impinging upon the crystals 714 has been reduced to the preselected norm. Conversely if the radiation impinging upon the crystal 714 falls below the preselected norm, a voltage will be produced across the terminals 722 and 724 of opposite sign to control the radiation valve 726 to increase the radiation allowed to pass to the cell 714 through the quartz crystal 728.

The radiation sensitive crystals have been found to be highly useful for automatic control of the aperture adjustment on cameras. This is extremely important for Armed Forces applications and use with airborne cameras which are located remotely from the operator. The simple manual device utilizing a radiation sensitive crystal of this type is illustrated in FIGURE 52. In FIGURE 52, 730 represents an externally toothed member connected to control the aperture adjustment of a camera and rotatable about the axis of the lens designated 732. This member is geared to a pivoted sector 734 pivotally mounted about the axis 736. Also pivotally mounted about the axis 736 is a coil 738 and an indicator arm 740 attached thereto for pivotal movement therewith. The coil 738 is interposed between the poles 742 and 744 of a suitable magnet. Coil 738 is connected in series with a compound type radiation sensitive crystal 746 and with a small battery 748. By this connection, the current flowing in the coil 738 will be proportional to the quantity of light impinging upon the cell 746 and, therefore, the deflection of the coil 738 from the field of the magnets defined by poles 742 and 746 will likewise be proportional to the light impinging upon the cell 746. Thus indicator 740 will assume a position about the axis 736 indicative of the quantity of light to which the crystal 746 is subjected. The indicia 750 upon the sector 734 are indicative of the various film speeds of the films which may be used in the camera. In operation, with the crystal 746 mounted upon the camera facing the object to be photographed, the indicator 740 will move to a position indicative of the light reflected from the object to be photographed. The control member 730 may then be rotated manually to adjust the aperture of the camera which, through its meshing engagement with the sector 734, will rotate the sector 734 relative to the indicator 740. When the indicator has been aligned with the indicium 750 representing the film speed in the camera at the time the photograph is made, the correct aperture setting for the camera has been achieved.

An automatic assembly for accomplishing aperture adjustment is illustrated in FIGURE 53. In this arrangement the objects illustrated within the confines of the square 760 will be located at the situs of the camera, as for example on the wing or under the belly of an aircraft, and the objects indicated within the square 762 will be located at the operator's station, as for example in the cockpit of an aircraft. The radiation sensitive cell 764 is located adjacent the camera and facing in the same direction as the camera toward the object to be photographed and is connected by lead wires 766 and 768 to a pivotally mounted coil 770 disposed between the magnet poles 772 and 774 and through a battery or other direct current power supply 776. Coil 770 is connected by a shaft 778 to a coaxially aligned plate 780 and through screw 781 to a coaxially aligned gear 782. Gear 782 is adjustable relative to shaft 778 for a purpose which will hereinafter be described by any suitable means such as by the engagement of screw 781 with a slot in plate 780. Gear 782 meshes with a gear 784 fixed to a shaft 786 which is fixed coaxially to the rotor coil 788 of the master unit of a conventional selsyn transmitter unit.

The operation of selsyn units is well known and need not herein be described in detail. For the purposes of the present invention it will suffice to state that the rotor coil 790 of the selsyn unit will assume an angular position identical with that of the rotor coils 788 of the master unit. The rotor coil 790 is connected to a shaft 792 to which is fixed a gear 794 which meshes with a gear 796 coaxial and fixed to aperture control member for the camera being controlled. Thus the rotation of the aperture control member 796 is proportional to the quantity of light striking the radiation sensitive cells 764. The relative adjustment between the plate 780 and the gear 782 provides an adjustment for the mechanism in accordance with the film speed of the film being used in the camera at the particular time and this adjustment will be calibrated in accordance therewith. This adjustment, of course, must be so located that it is readily adjustable by the operator. This device therefore, provides for the automatic adjustment of the camera aperture in accordance with the light reflected from the object to be photographed and therefore produces correct exposure for each picture.

CONCLUSION

From the foregoing detailed description it is apparent that I have provided certain new and useful improvements in the field of radiation sensitive elements and semi-conductors in which compounds, the atoms of the elements of which are associated by covalent bonds only, are utilized for the sensing of various wave lengths of radiation and for the formation of circuit elements exhibiting the transistor effect which may be utilized in forming small stable electrical circuit components. The radiation sensitive elements exhibit the highest radiation sensitivity of any elements known. Due to the high sensitivity of these elements, extremely small units may be utilized. It is contemplated that these units, which are very low in power consumption, will entirely replace the photomultipliers hereinbefore used, will eliminate the necessity of fluorescent screens for ultra-violet detection due to the wide frequency response of these crystals, and, due to their simplicity in compactness, will be of extremely great importance to the Armed Forces for radiation sensing as well as electrical circuitry.

What is claimed and desired to be secured by United States Letters Patent is:

1. A method of producing chemically pure amorphous cadmium sulphide comprising the steps of introducing chemically pure cadmium sulfate into a chemically pure aqueous solution of sodium thiosulphate, heating said solution containing said cadmium sulfate to its boiling point, maintaining the temperature of the solution at its boiling point and maintaining continuous agitation of the solution until a precipitate of amorphous cadmium sulphide and colloidal sulphur is formed, maintaining said solution substantially neutral during boiling thereof and during precipitation of the cadmium sulphide and sulphur, separating said precipitate from the residual liquid, and subsequently separating the sulphur of the precipitate from the cadmium sulphide.

References Cited

UNITED STATES PATENTS 2,173,895   9/1939   Booge _____ 23—135 XR

FOREIGN PATENTS 14,055   9/1962   Japan.

OTHER REFERENCES

Mellor's Modern Inorganic Chemistry: 1939 Edition, p. 442.

Grillot-Chem. Abstracts: vol. 45, No. 15, 1951, column 6109h.

OSCAR R. VERTIZ, *Primary Examiner.*

B. H. LEVENSON, *Assistant Examiner.*

U.S. Cl. X.R.

252—301.4